United States Patent
Acar

(10) Patent No.: US 10,051,076 B2
(45) Date of Patent: Aug. 14, 2018

(54) LOW POWER DIGITAL RADIO RANGE EXTENSION

(71) Applicant: AIRTIES KABLOSUZ ILETISIM SAN. VE DIS TIC. A.S., Istanbul (TR)

(72) Inventor: Irfan Acar, Istanbul (TR)

(73) Assignee: AIRTIES KABLOSUZ ILETISIM SAN. VE DIS TIC. A.S., Istanbul (TR)

( * ) Notice: Subject to any disclaimer, the term of this patent is extended or adjusted under 35 U.S.C. 154(b) by 0 days.

(21) Appl. No.: 14/982,211

(22) Filed: Dec. 29, 2015

(65) Prior Publication Data

US 2016/0191642 A1 Jun. 30, 2016

Related U.S. Application Data

(60) Provisional application No. 62/098,509, filed on Dec. 31, 2014.

(30) Foreign Application Priority Data

Dec. 22, 2015 (WO) .................. PCT/EP2015/081041

(51) Int. Cl.
| | |
|---|---|
| *H04W 88/10* | (2009.01) |
| *H04L 29/08* | (2006.01) |
| *H04W 4/80* | (2018.01) |
| *H04W 84/18* | (2009.01) |
| *H04W 84/12* | (2009.01) |

(52) U.S. Cl.
CPC .......... *H04L 67/2814* (2013.01); *H04W 4/80* (2018.02); *H04W 84/12* (2013.01); *H04W 84/18* (2013.01); *H04W 88/10* (2013.01); *Y02D 70/00* (2018.01); *Y02D 70/142* (2018.01); *Y02D 70/144* (2018.01); *Y02D 70/162* (2018.01); *Y02D 70/22* (2018.01)

(58) Field of Classification Search
None
See application file for complete search history.

(56) References Cited

U.S. PATENT DOCUMENTS

| | | | |
|---|---|---|---|
| 2003/0054794 A1* | 3/2003 | Zhang ............... | H04W 88/04 455/403 |
| 2004/0192227 A1 | 9/2004 | Beach et al. | |

(Continued)

FOREIGN PATENT DOCUMENTS

EP 1343280 A1 9/2003

OTHER PUBLICATIONS

International Search Report dated Apr. 21, 2016 for International Application No. PCT/EP2015/081041.

*Primary Examiner* — David Bilodeau
(74) *Attorney, Agent, or Firm* — Harness, Dickey & Pierce, P.L.C.

(57) ABSTRACT

A method of enabling extended range communication between a first low power digital radio device and a second low power digital radio device via an intermediate access point; which intermediate access point has a low power digital radio interface and an other communications interface and forms part of a communication network; wherein the intermediate access point is adapted to perform a proxy function for the second low power digital radio device, thereby to enable the first low power digital radio device to send and receive data to the second low power digital radio device via the intermediate access point.

18 Claims, 25 Drawing Sheets

(56) References Cited

U.S. PATENT DOCUMENTS

| | | | | |
|---|---|---|---|---|
| 2007/0070960 A1* | 3/2007 | Barak | ................ | H04W 76/025 370/338 |
| 2011/0014929 A1* | 1/2011 | Moshfeghi | .............. | H04W 4/02 455/456.3 |
| 2011/0214131 A1* | 9/2011 | Luna | ....................... | H04L 69/32 719/318 |

\* cited by examiner

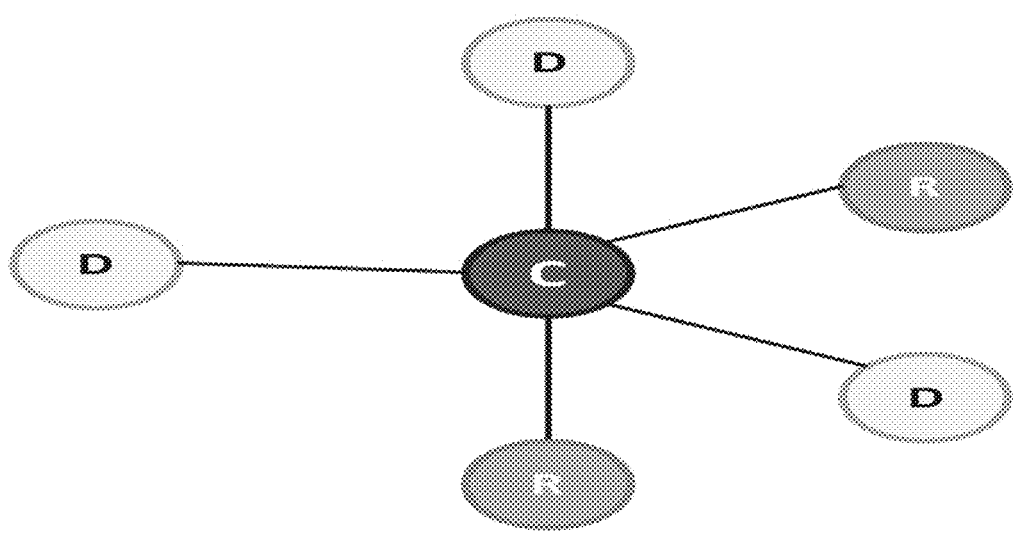
Figure 16: ZigBee star topology

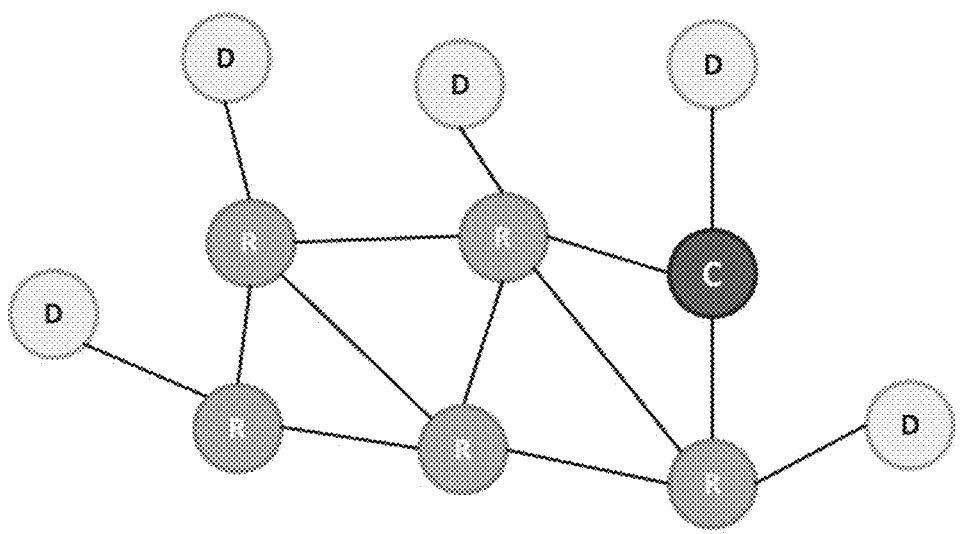
Figure 17: ZigBee mesh topology

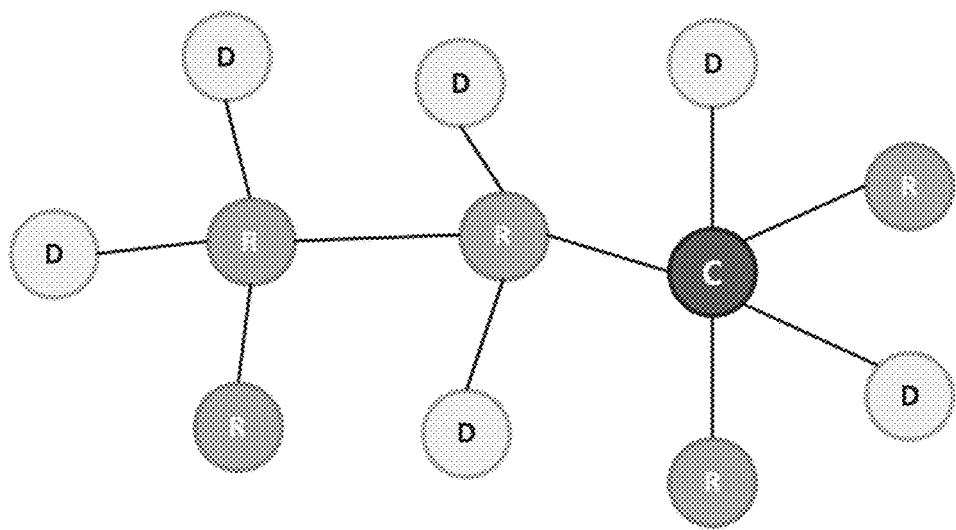
Figure 18: ZigBee tree topology

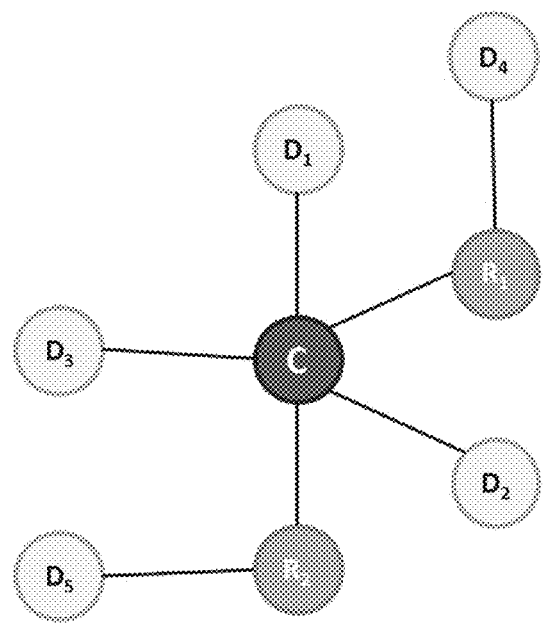
Figure 19: A ZigBee network

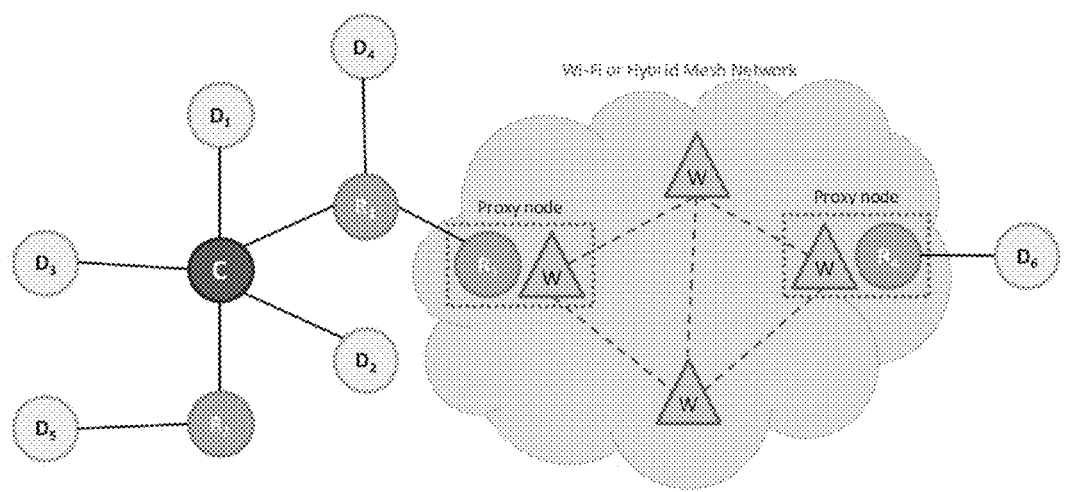
Figure 20: ZigBee range extension through a Wi-Fi mesh network

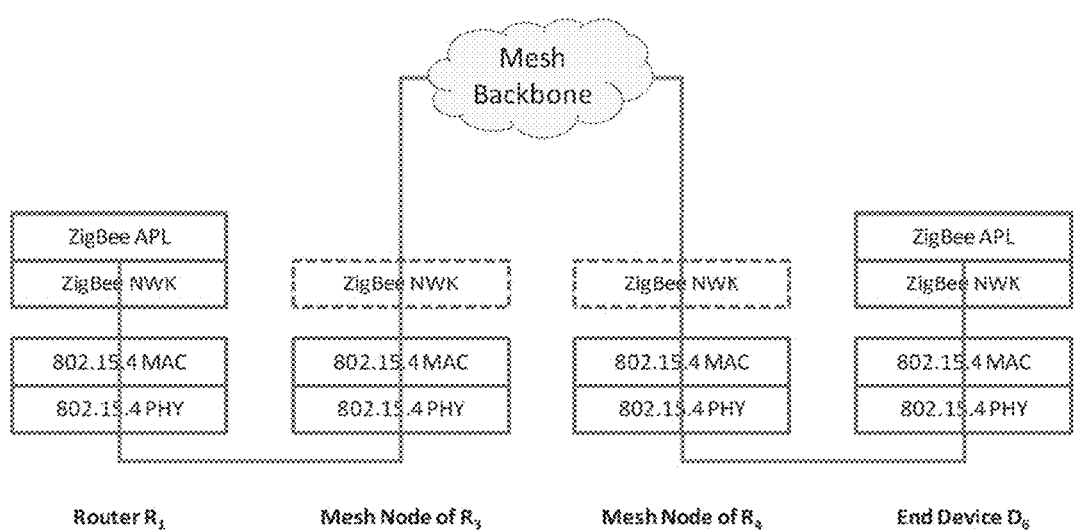
Figure 21: Network layer proxy

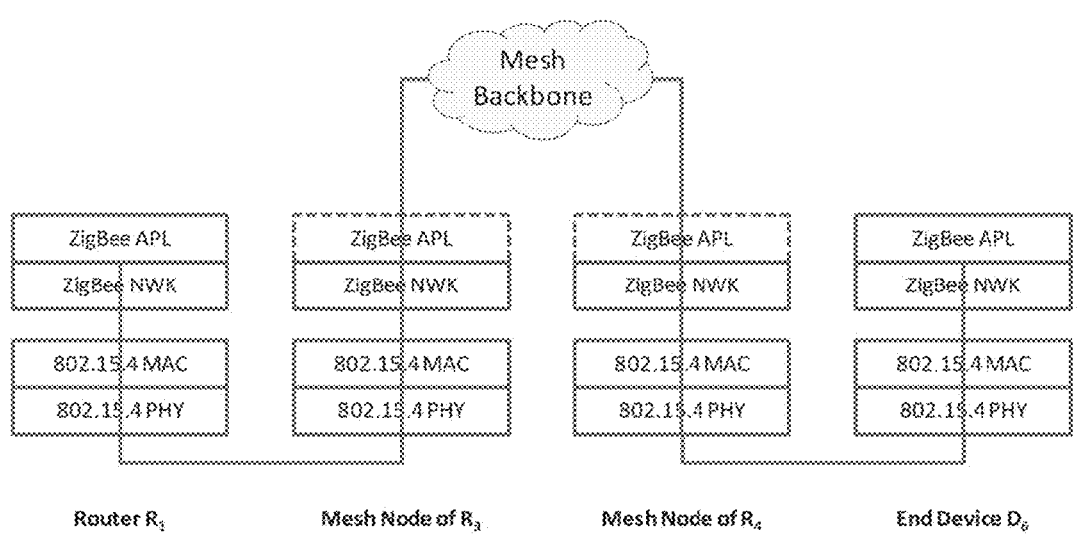
Figure 22: Application layer proxy

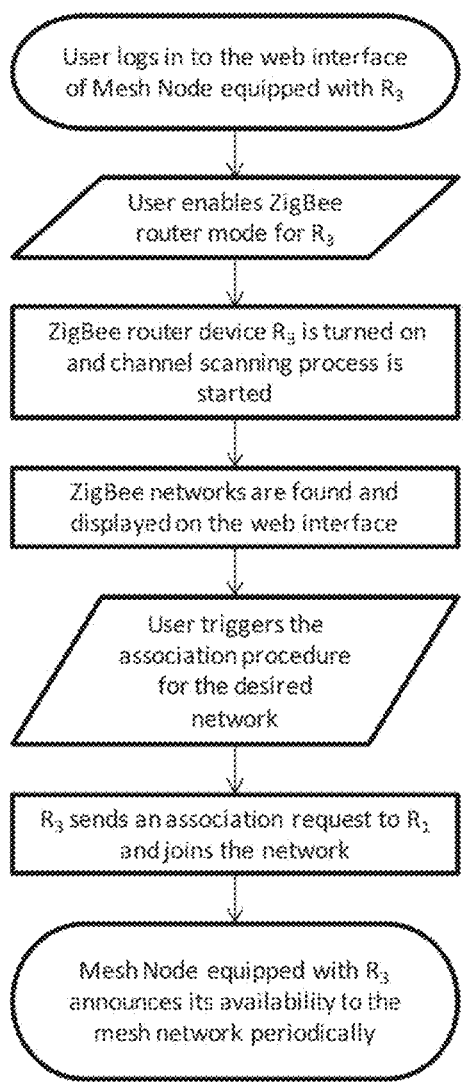
Figure 23: Network proxy configuration

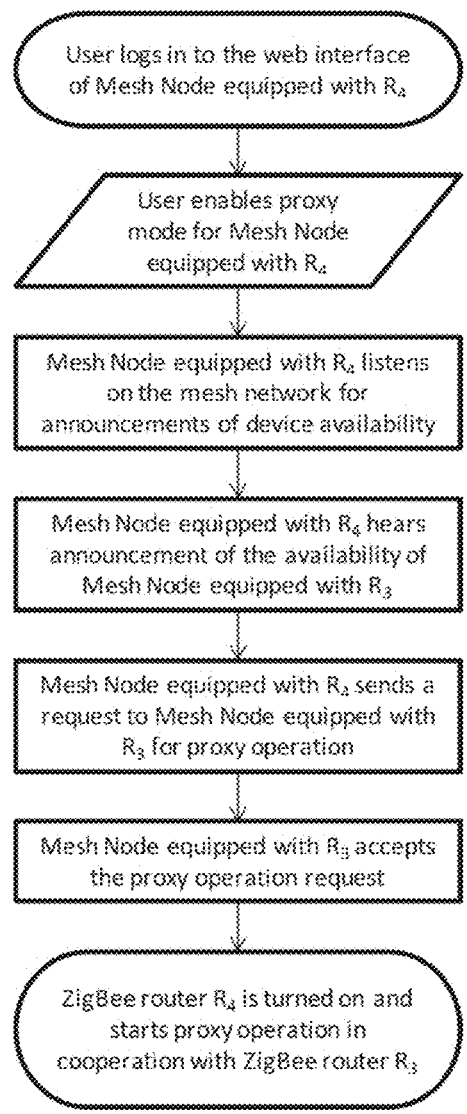
Figure 24: End device proxy configuration

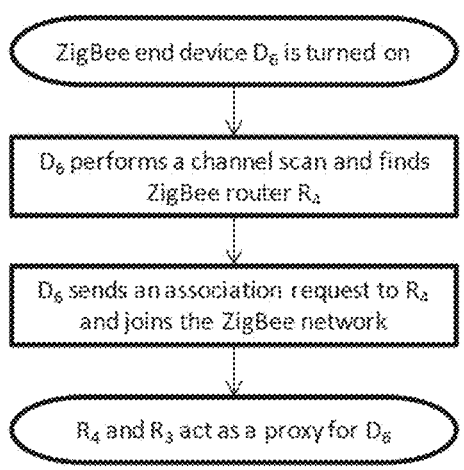
Figure 25: Proxy discovery and operation

LOW POWER DIGITAL RADIO RANGE EXTENSION

CROSS-REFERENCE TO RELATED APPLICATIONS

This U.S. non-provisional application claims the benefit of priority under 35 U.S.C. § 119 to U.S. Provisional Patent Application No. 62/098,509 filed in the United States Patent and Trademark Office on Dec. 31, 2014, and International Patent Application No. PCT/EP2015/081041 filed in the European Patent Office on Dec. 22, 2015 the disclosure of each of which is incorporated herein in its entirety by reference.

TECHNICAL FIELD OF THE INVENTION

The invention relates to low power digital radio communication range extension in Wi-Fi and Hybrid Mesh networks.

BACKGROUND TO THE INVENTION

Short-range communication technologies, such as Bluetooth and ZigBee, are intended to replace the cables connecting portable and/or fixed electronic devices. Key features of such technologies are robustness, low power consumption, and low cost.

However, due to their limited range of communication distance, low-power digital radio devices, such as Bluetooth and ZigBee devices, are not readily employed within larger scale environments (such as between multiple rooms in a building, or between multiple buildings) to transmit and control apparatus.

For example, Bluetooth is a wireless technology standard for exchanging data over short distances, designed for small-size personal devices such as mobile phones, tablets, and laptops. Target applications include networking of computers and peripherals, data transfer and synchronization, remote monitoring and control of smart appliances, heating systems, entertainment devices, and industrial automation. Bluetooth utilizes the unlicensed 2.4 GHz Industrial, Scientific, and Medical (ISM) band.

There are two forms of Bluetooth wireless technology systems: Basic Rate (BR) and Low Energy (LE). Both systems include device discovery, connection establishment and connection mechanisms. The BR system includes the optional Enhanced Data Rate (EDR) and Alternate MAC (Media Access Control)/PHY (Physical layer) (AMP) extensions. The LE system is designed for use with cases and applications with lower data rates and has lower duty cycles. LE systems usually have lower current consumption, lower complexity and lower cost than BR.

Bluetooth Low Energy (BLE) started as part of the Bluetooth 4.0 Core Specification. Although the Bluetooth specification covers both classic Bluetooth and Bluetooth Low Energy, these two wireless communication standards are not directly compatible and Bluetooth devices qualified on any specification version prior to 4.0 cannot communicate in any way with a BLE device. The on-air protocol, the upper protocol layers, and the applications are different and incompatible between the two technologies. However, dual-mode devices that implement both BR/EDR and BLE can communicate with any Bluetooth device.

In Classic Bluetooth, the BR/EDR radio operates in the unlicensed ISM band at 2.4 GHz. The system employs a frequency hopping transceiver to combat interference and fading. The basic hopping pattern is a pseudo-random ordering of the 79 designated Bluetooth channels, each having a bandwidth of 1 MHz. The hopping pattern can be adapted to exclude frequencies that are used by interfering devices. The slave devices in a piconet are synchronized to the common clock and frequency hopping pattern provided by the master device.

The physical channel is subdivided into 625 µs timeslots. Data is transmitted between Bluetooth devices in packets that are positioned in these slots. The master uses even-numbered slots to address each slave in turn, and each addressed slave has the opportunity to answer in the following odd-numbered timeslot. Frequency hopping takes place between the transmission or reception of packets.

The symbol rate is 1 megasymbol per second supporting the bit rate of 1 Megabit per second (Mbps) or, with EDR, a gross air bit rate of 2 or 3 Mbps. Bandwidth is required for a 72-bit access code to identify the piconet, and a 54-bit packet header to identify the slave. The radio also requires a guard band of at least 150 µs between packets to allow it to retune and stabilize on the next hopping frequency. Within a one slot packet, these requirements leave only a portion of the bandwidth for the payload data—and this can only be transmitted every other slot. One way to mitigate this limitation is to transmit for a longer period of time: 3 or 5 slots. All of the extra bandwidth can then be used for payload data. In a BR package, a five-slot packet can have up to 341 information bytes (including the 2-byte payload header) plus a 16-bit Cyclic Redundancy Check (CRC) code. A 32-bit Message Integrity Code (MIC) is also present when encryption is enabled.

Due to data being transmitted between Bluetooth devices in packets that are positioned in 625 µs timeslots with an Inter Frame Space of 150 µs between packets and the master using even-numbered slots to address a slave, and the slave answering in the following odd-numbered timeslot, real-time constraints can be a problem if Bluetooth devices are not configured to operate in the normal way. Similarly, ZigBee is a standard specification that relates to technology that is designed to be of low cost and low complexity, with devices having a limited range of transmission.

SUMMARY OF THE INVENTION

In order to mitigate for at least some of the above problems, there is provided a method of enabling extended range communication between a first low power digital radio device and a second low power digital radio device via an intermediate access point; which intermediate access point has a low power digital radio interface and an other communications interface and forms part of a communication network; wherein the intermediate access point is adapted to perform a proxy function for the second low power digital radio device, thereby to enable the first low power digital radio device to send and receive data to the second low power digital radio device via the intermediate access point.

In order to mitigate for at least some of the above problems, there is also provided an access point for use in a communications network, the access point comprising: a low power digital radio interface and an other communications interface; wherein the access point is adapted to perform a proxy function between a first low power digital radio device and a second low power digital radio device in the communications network, thereby to enable the first low power digital radio device to send and receive data to the second low power digital radio device via the access point.

Further aspects of the invention will be apparent from the appended claim set.

Beneficially, according to an implementation, the two Bluetooth devices operate normally and are not aware that they are talking to a far away device through an intermediate network.

In an embodiment, the communication is terminated below the host layer and the Bluetooth controller stacks are used at the mesh nodes to handle the real-time communication. The host layers within the mesh nodes then tolerate the large and or variable delay of multi-hop communication within the network.

BRIEF DESCRIPTION OF THE DRAWINGS

FIG. 16 is a schematic showing ZigBee star topology;

FIG. 17 is a schematic showing ZigBee mesh topology;

FIG. 18 is a schematic showing ZigBee tree topology;

FIG. 19 is a schematic showing a ZigBee network;

FIG. 20 is a schematic showing ZigBee range extension through a Wi-Fi mesh network;

FIG. 21 is a schematic showing Network layer proxy;

FIG. 22 is a schematic showing Application layer proxy;

FIG. 23 is a schematic showing Network proxy configuration;

FIG. 24 is a schematic showing End device proxy configuration; and

FIG. 25 is a schematic showing Proxy discovery and operation.

DETAILED DESCRIPTION

It is an aim of the invention to provide extended communication between low-power radio devices using an existing Wi-Fi mesh network infrastructure. Wi-Fi mesh end nodes equipped with embedded low-power radio devices are employed to proxy the communications between two low-power radio end devices, such as Bluetooth devices, which are outside transmission ranges of each other. Intermediate Wi-Fi mesh nodes, not necessarily equipped with embedded low-power radio devices, forward communications, such as Bluetooth and ZigBee communications, to extend the ranges of low-power radio end devices throughout the coverage area of the Wi-Fi mesh network.

The proposed method is not limited to Wi-Fi mesh networks. It can also be used in hybrid mesh networks where the mesh nodes comprise arbitrary combinations of Wi-Fi, Power-Line Communication (PLC), Ethernet, or even Bluetooth devices.

This range extension method can also be used to extend the ranges of ZigBee devices using mesh nodes equipped with embedded ZigBee devices or indeed other low power digital RF communication devices.

Figure 1:
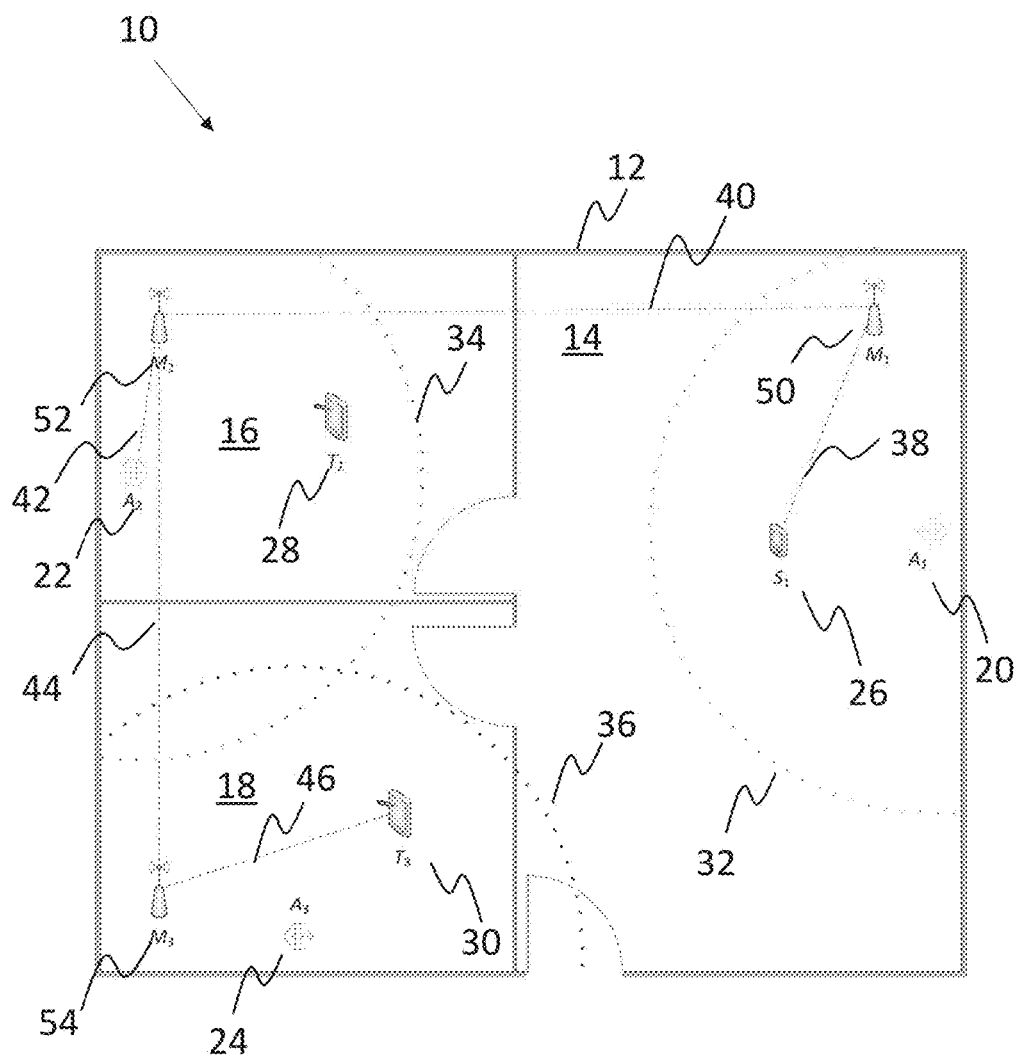
FIG. 1 is a schematic showing Bluetooth devices integrated with a Wi-Fi mesh network.

At FIG. 1, there is shown an example of extended communication in a home networking environment 10. A three-room house floor 12 is depicted in FIG. 1 with one Bluetooth thermostat in each room: A1 20, A2 22, and A3 24. Also shown are a smart phone S1 26 and two tablets T2 28 and T3 30, each equipped with Bluetooth devices. The transmission ranges of the thermostats 20, 22, 24 are shown using dotted circular lines 32, 34, 36 respectively, where dotted circular line 32 corresponds to the transmission range of thermostat A1 20, dotted circular line 34 corresponds to the transmission range of thermostat A2 2 and dotted circular line 36 corresponds to the transmission range of thermostat A3 24.

In the example of FIG. 1, due to the limited transmission range 32 of thermostat A1 20, smart phone S1 26 can directly communicate only with thermostat A1 20 and not with thermostats A2 22 and A3 24. Similarly, due to the limited transmission range 34 of thermostat A2 22, Tablet T2 28 can directly communicate only with thermostat A2 22 and not with thermostats A1 20 and A3 24, and due to the limited transmission range 36 of thermostat A3 24, Tablet T3 30 can directly communicate only with thermostat A3 24 and not with thermostats A1 20 and A2 22.

On the same floor 12, there is a Wi-Fi mesh network, formed by the wireless access points M1 50, M2 52, and M3 54. Each access point M1 50, M2 52, and M3 54 is a mesh node that can talk to every other access point M1 50, M2 52, and M3 54 over a Wi-Fi link 40, 44, either via a single hop or multiple hops (for example from M1 50 to M2 52 via Wi-Fi link 40, or from M2 52 to M3 54 via Wi-Fi link 44, or between M1 50 and M3 54 via access point M2 52 and Wi-Fi links 40, 44). In the example shown, each access point M1 50, M2 52, and M3 54 is also equipped with a Bluetooth device.

In the example of FIG. 1, the transmission ranges of the Bluetooth devices of the devices in communication with the Wi-Fi mesh nodes M1 50, M2 52, and M3 54 are extended by having the Wi-Fi mesh nodes M1 50, M2 52, and M3 54 that receive the Bluetooth transmissions, forward the received Bluetooth transmissions through the Wi-Fi mesh network to other Wi-Fi mesh nodes M1 50, M2 52, and M3 54, which will then retransmit them over the air using their integrated Bluetooth devices. As an example, although the smart phone Si 26 in FIG. 1 is outside the transmission range 34 of the thermostat A2 22, it can communicate with thermostat A2 22 through the Wi-Fi mesh proxy formed by the access points M1 50 and M2 52.

Note that the mesh nodes M1 50, M2 52, and M3 54 can be equipped with dual mode Bluetooth devices so that they can proxy classic and/or low energy Bluetooth communications.

Figure 2:
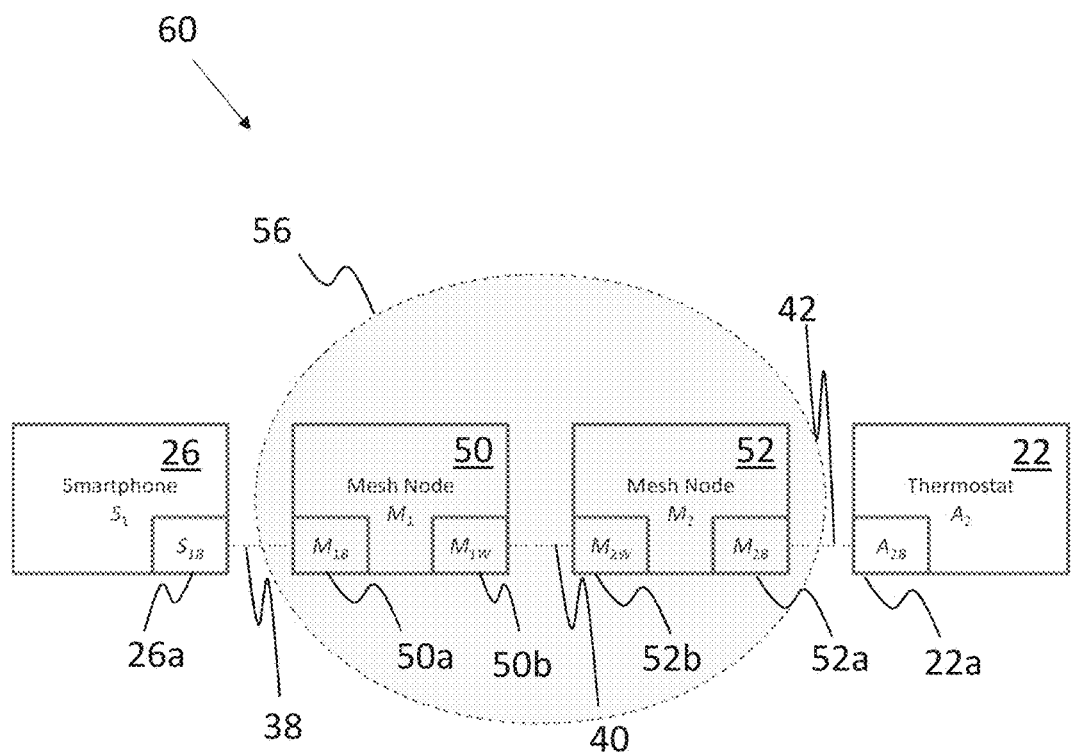
FIG. 2 is a schematic showing Bluetooth range extension through a Wi-Fi mesh proxy.

A partial block diagram 60 of the setup in FIG. 1 is shown in FIG. 2. FIG. 2 shows a smartphone S1 in communication with a mesh node M1 50 via Bluetooth link 38. Thermostat A2 22 is shown to be in communication with mesh node M2 52 via Bluetooth link 42. Mesh node M1 50 and mesh node M2 52 are linked by Wi-Fi link 40. Mesh node M1 50 and mesh node M2 52 form a network 56.

Bluetooth devices 26*a*, 50*a*, 52*a*, 22*a* are shown with the subscript B and Wi-Fi devices 50*b*, 52*b* are shown with the subscript W. For example, M1B 50*a* is the Bluetooth device on the Wi-Fi mesh node M1 50 and M1W 50*b* is its Wi-Fi device. The communication links between devices S1 26 and A2 22 are shown using dashed lines 38, 40, 42. The Bluetooth device 26*a* on the smart phone S1 26 can communicate with the Bluetooth device 22*a* on the thermostat A2 22 even though they are not within range of each other, as shown at FIG. 1.

In further examples, the nodes M1 50 and M2 52 do not have to have a direct link 40. The communication between the Wi-Fi devices M1W 50*b* and M2W 52*b* can be realized via a multi-hop link through other Wi-Fi mesh nodes that may be present in the network 56.

In yet further examples, the nodes M1 50 and M2 52 do not have to have a direct link 40 and the communication that is shown to be realized via a Wi-Fi link can be replaced with a hybrid mesh backbone having at least two different types of communication channel between Smartphone S1 26 and Thermostat A2 22. For example, the communication channels may be selected from at least power line communication (PLC), Wi-Fi and Ethernet, communication channels. In an example, Smartphone S1 26 could communicate via a Bluetooth communication channel with a mesh node access point that could forward communications via a PLC interface into a mesh cloud and the communications subsequently could be received by a mesh node access point at the other end through an Ethernet interface. Other permutations of communication through a hybrid mesh backbone that forms the network 56 are envisaged.

Figure 3:
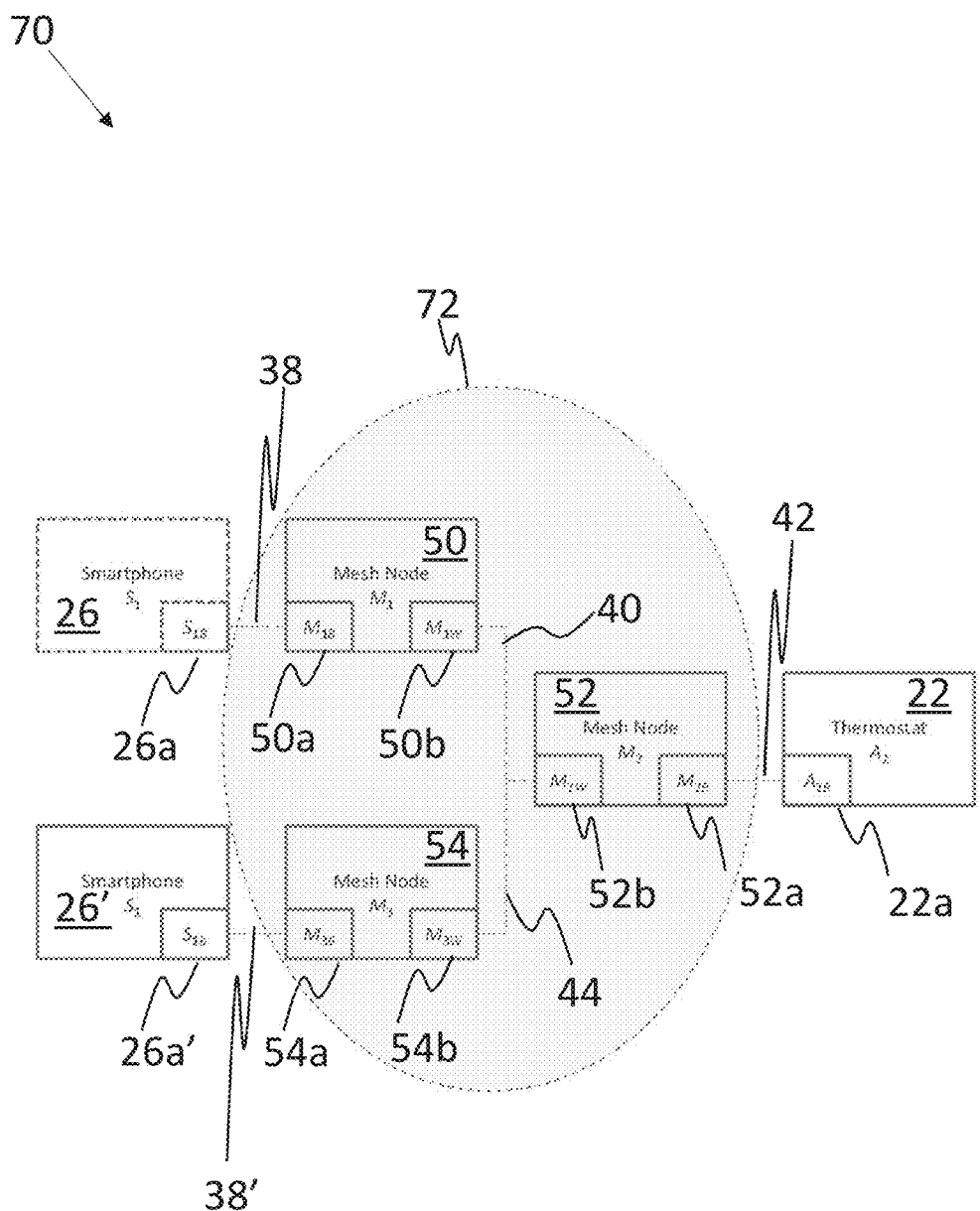
FIG. 3 is a schematic showing Bluetooth devices roaming.

The proposed range extension method also allows roaming 70 as shown in FIG. 3. There is shown a network 72 of three mesh nodes M1 50, M2 52, and M3 54. Mesh node M1 50 communicates with mesh node M2 52 via link 40 that is formed between the Wi-Fi device M1W 50*b* of mesh node M1 50 and the Wi-Fi device M2W 52*b* of mesh node M2 52. Mesh node M2 52 communicates with mesh node M3 54 via link 44 that is formed between the Wi-Fi device M2W 52*b* of mesh node M2 52 and the Wi-Fi device M3W 54*b* of mesh node M3 54. Mesh node M2 52 is in communication with thermostat A2 22 via link 42 that is formed between the Bluetooth device M2B 52*a* of mesh node M2 52 and the Wi-Fi device A2B 22*a* of thermostat A2 22.

In an example, the smart phone S1 26 could move from the vicinity of mesh node M1 50 to the vicinity of mesh node M3 54 and still continue to communicate with the thermostat A2 22. FIG. 3 shows smart phone S1 26 at a first position in the vicinity of mesh node M1 50, and is in communication with mesh node M1 50 via link 38 formed between the Bluetooth device S1B 26*a* of smart phone S1 26 and the Wi-Fi device M1B 50*a* of mesh node M1 50. FIG. 3 also shows smart phone S1 26' at a second position at an alternative location in the vicinity of mesh node M3 54. Smart phone S1 26' is in communication with mesh node M3 54 via link 38' formed between the Bluetooth device S1B 26*a*' of smart phone S1 26' and the Wi-Fi device M3B 54*a* of mesh node M3 54. In use, when a user changes location, for example when they move around on the floor 12 shown at FIG. 1, the user may relocate from the first position shown by smart phone S1 26 at FIG. 3 to the second position shown by smart phone S1 26' at FIG. 3.

When the user has moved from the first position to the second position, instead of forwarding the Bluetooth communication through M1 50 and M2 52, the mesh network 82 would then start using the path through M3 54 and M2 52. However, note that the Bluetooth communication might not be seamless during this transition.

Whilst the example of FIG. 3 shows direct Wi-Fi connections between mesh nodes M1 50, M2 52 and M3 54, in further examples, the network 72 is formed of a hybrid mesh backbone where an unlimited number of mesh nodes communicate with one another using convenient communication channels, such as PLC, Wi-Fi and Ethernet. In some examples the network 72 is formed from a hybrid mesh backbone having at least two different types of communication channel between the smartphone S1 26 and thermostat A2 22, or the smartphone S1' 26' and the thermostat A2 22.

In some cases, the proposed range extension method also allows simultaneous access to the resources of a Bluetooth device by multiple out-of-range Bluetooth devices. For example, for the setup in FIG. 1, both the smart phone S1 26 and the tablet T3 30 can simultaneously access the thermostat A2 22 as shown in FIG. 4.

Figure 4:
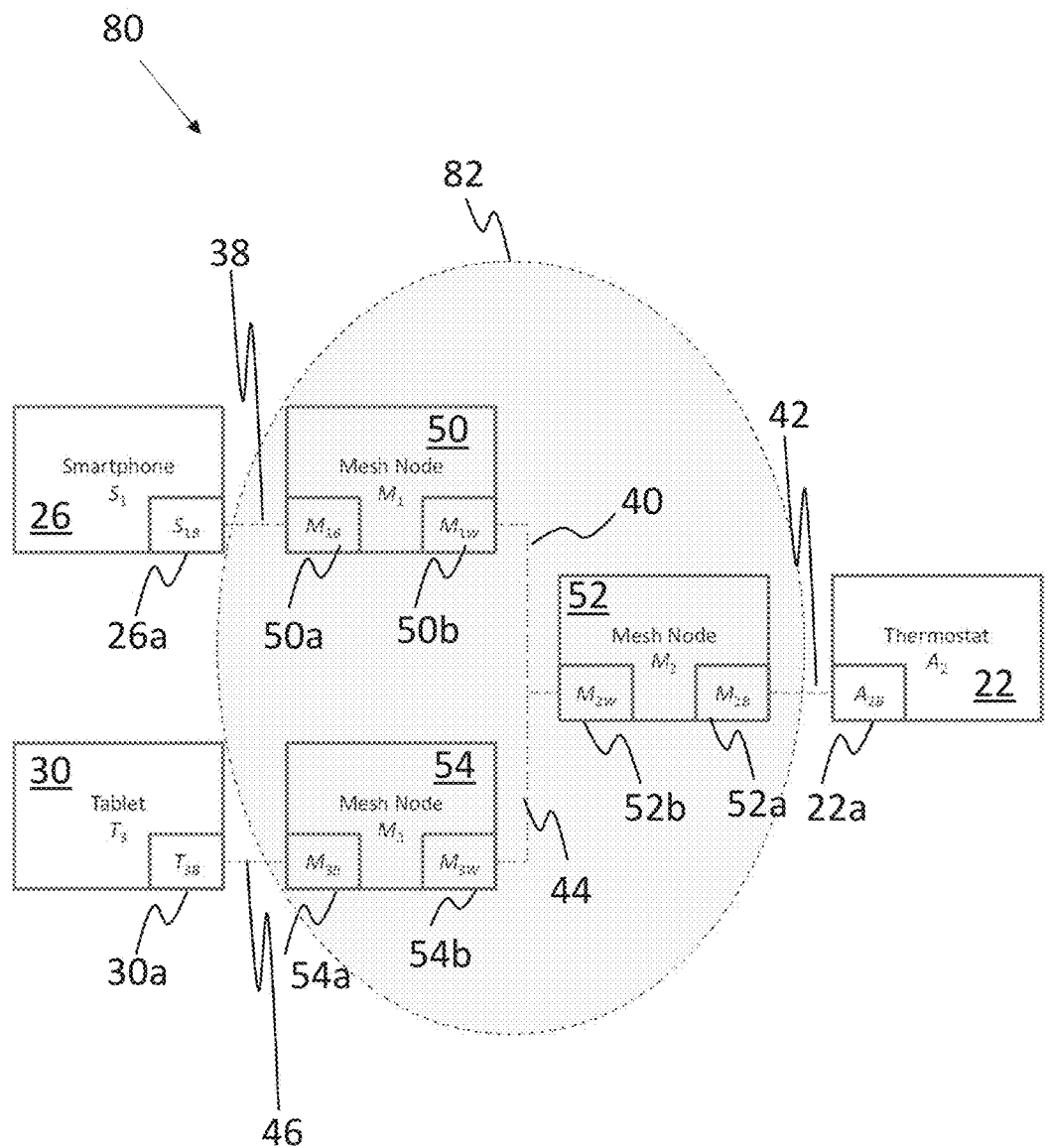
FIG. 4 is a schematic showing simultaneous multiple access to a resource through the Wi-Fi mesh proxy.

FIG. 4 shows a schematic 80 of a set-up for simultaneous access of the thermostat A2 22. There is shown at FIG. 4 a network 82 of three mesh nodes M1 50, M2 52, and M3 54. Mesh node M1 50 communicates with mesh node M2 52 via link 40 that is formed between the Wi-Fi device M1W 50*b* of mesh node M1 50 and the Wi-Fi device M2W 52*b* of mesh node M2 52. Mesh node M2 52 communicates with mesh node M3 54 via link 44 that is formed between the Wi-Fi device M2W 52*b* of mesh node M2 52 and the Wi-Fi device M3W 54*b* of mesh node M3 54. Mesh node M2 52 is in communication with thermostat A2 22 via link 42 that is formed between the Bluetooth device M2B 52*a* of mesh node M2 52 and the Wi-Fi device A2B 22*a* of thermostat A2 22.

Further, there is shown smart phone S1 26 in the vicinity of mesh node M1 50. Smart phone S1 26 is in communication with mesh node M1 50 via link 38 formed between the Bluetooth device S1B 26*a* of smart phone S1 26 and the Wi-Fi device M1B 50*a* of mesh node M1 50. Furthermore, there is shown tablet T3 30 in the vicinity of mesh node M3 54. Tablet T3 30 is in communication with mesh node M3 54 via link 46 formed between the Bluetooth device T3B 30*a* of tablet T3 30 and the Wi-Fi device M3B 54*a* of mesh node M3 54. In the set-up 80 of FIG. 4, while S1 26 accesses A2 22 through M1 50 and M2 52, T3 30 accesses A2 22 through M3 54 and M2 52.

Depending on the specific use case, proper arbitration logic may need to be implemented in the mesh network 82. For example, the connectionless broadcasting use case for BLE, described later, can operate in the mode shown in FIG. 4. Thus, the advertisements sent by the thermostat A2 22 can be heard by both the smart phone S1 26 and the tablet T3 30.

Whilst the example of FIG. 4 shows direct Wi-Fi connections between mesh nodes M1 50, M2 52 and M3 54, in further examples, the network 82 is formed of a hybrid mesh backbone where an unlimited number of mesh nodes communicate with one another using convenient communication channels, such as PLC, Wi-Fi and Ethernet. In some examples the network 82 is formed from a hybrid mesh backbone having at least two different types of communication channel between the smartphone S1 26 and thermostat A2 22, or the tablet T3 30 and the thermostat A2 22.

Similarly, it is also possible for a Bluetooth device to simultaneously access the resources of multiple out-of-range Bluetooth devices. For example, for the setup in FIG. 1, the tablet T2 28 could simultaneously access both of the thermostats A1 20 and A3 24 as shown in the system 90 illustrated at FIG. 5.

Figure 5:
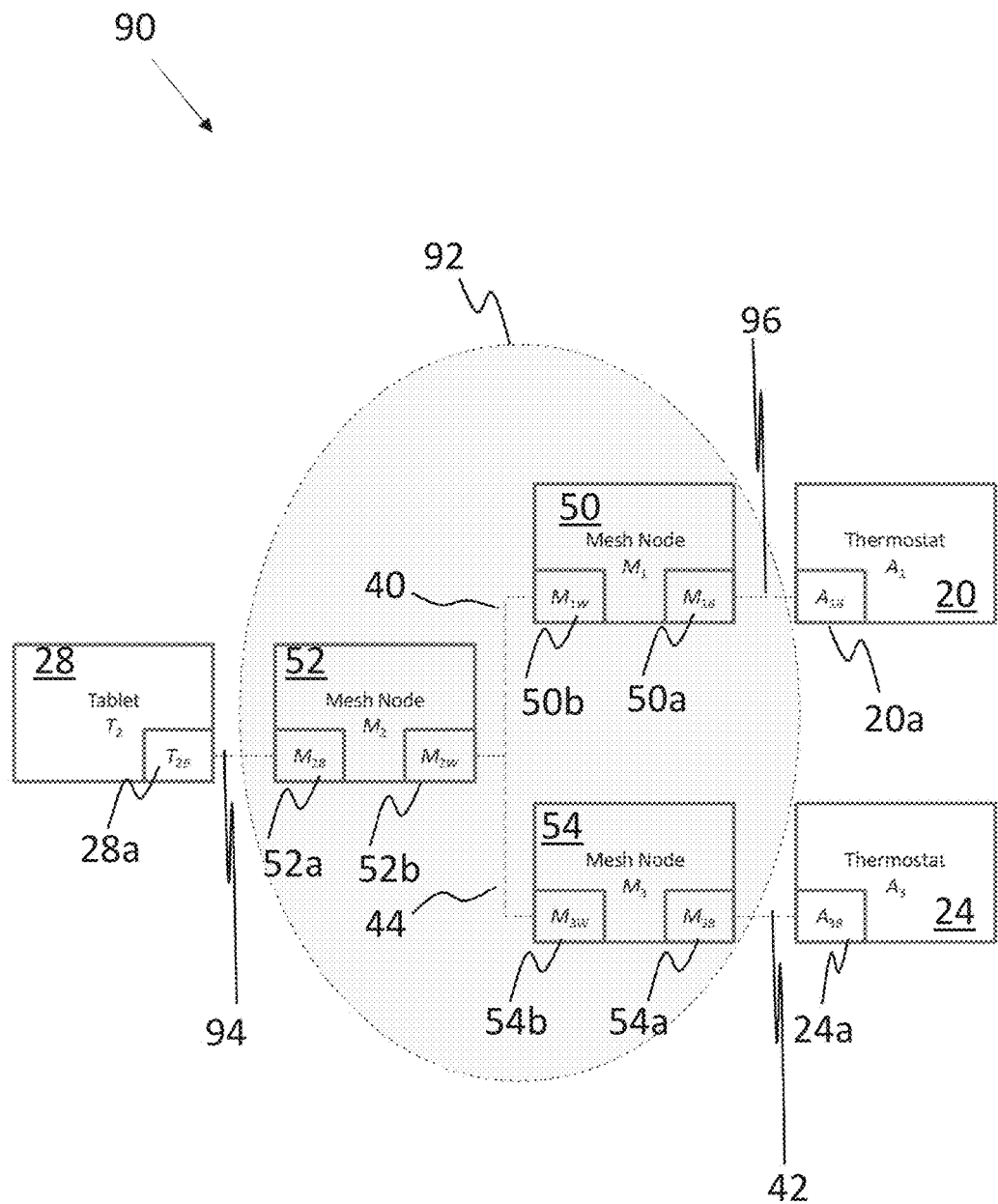
FIG. 5 is a schematic showing simultaneous access to multiple resources through the Wi-Fi mesh proxy.

There is shown at FIG. 5 a network 92 of three mesh nodes M1 50, M2 52, and M3 54. Mesh node M1 50 communicates with mesh node M2 52 via link 40 that is formed between the Wi-Fi device M1W 50b of mesh node M1 50 and the Wi-Fi device M2W 52b of mesh node M2 52. Mesh node M2 52 communicates with mesh node M3 54 via link 44 that is formed between the Wi-Fi device M2W 52b of mesh node M2 52 and the Wi-Fi device M3W 54b of mesh node M3 54. Mesh node M2 52 is in communication with tablet T2 28 via link 94 that is formed between the Bluetooth device M2B 52a of mesh node M2 52 and the Wi-Fi device T2B 28a of tablet T2 28a.

Further, there is shown thermostat A1 20 in the vicinity of mesh node M1 50. Thermostat A1 20 is in communication with mesh node M1 50 via link 96 formed between the Bluetooth device A1B 20a of thermostat A1 20 and the Wi-Fi device M1B 50a of mesh node M1 50. Furthermore, there is shown thermostat A3 24 in the vicinity of mesh node M3 54. Thermostat A3 24 is in communication with mesh node M3 54 via link 98 formed between the Bluetooth device A2B 24a of thermostat A2 24 and the Wi-Fi device M3B 54a of mesh node M3 54. In the set-up 90 of FIG. 4, while T2 28 accesses A1 20 through M2 52 and M1 50, it accesses A3 24 through M2 52 and M3 54.

Whilst the example of FIG. 5 shows direct Wi-Fi connections between mesh nodes M1 50, M2 52 and M3 54, in further examples, the network 92 is formed of a hybrid mesh backbone where an unlimited number of mesh nodes communicate with one another using convenient communication channels, such as PLC, Wi-Fi and Ethernet. In some examples the network 92 is formed from a hybrid mesh backbone having at least two different types of communication channel between the tablet T2 28 and thermostats A3 24, or the tablet T2 28 and the thermostat A1 20.

The proposed range extension method does not preclude scenarios where the Bluetooth devices and mesh nodes are members of piconets of size greater than two. For example, in FIG. 5, assuming that the tablet T2 28 is a Bluetooth master, another Bluetooth slave device, for example a Bluetooth speaker, could also be connected to it. The communication between the tablet and the speaker would operate independently of the range extension through the mesh node M2 52. Or, assuming that M2B 52b is a Bluetooth master, another independent Bluetooth slave device besides T2 28 could also be connected to it. In other words, each Bluetooth connection could be part of an independent Bluetooth piconet star topology.

Note that a Bluetooth device can also have a dual mode Bluetooth device and thus can be part of both a classic Bluetooth piconet and a low energy Bluetooth piconet.

Figure 6:
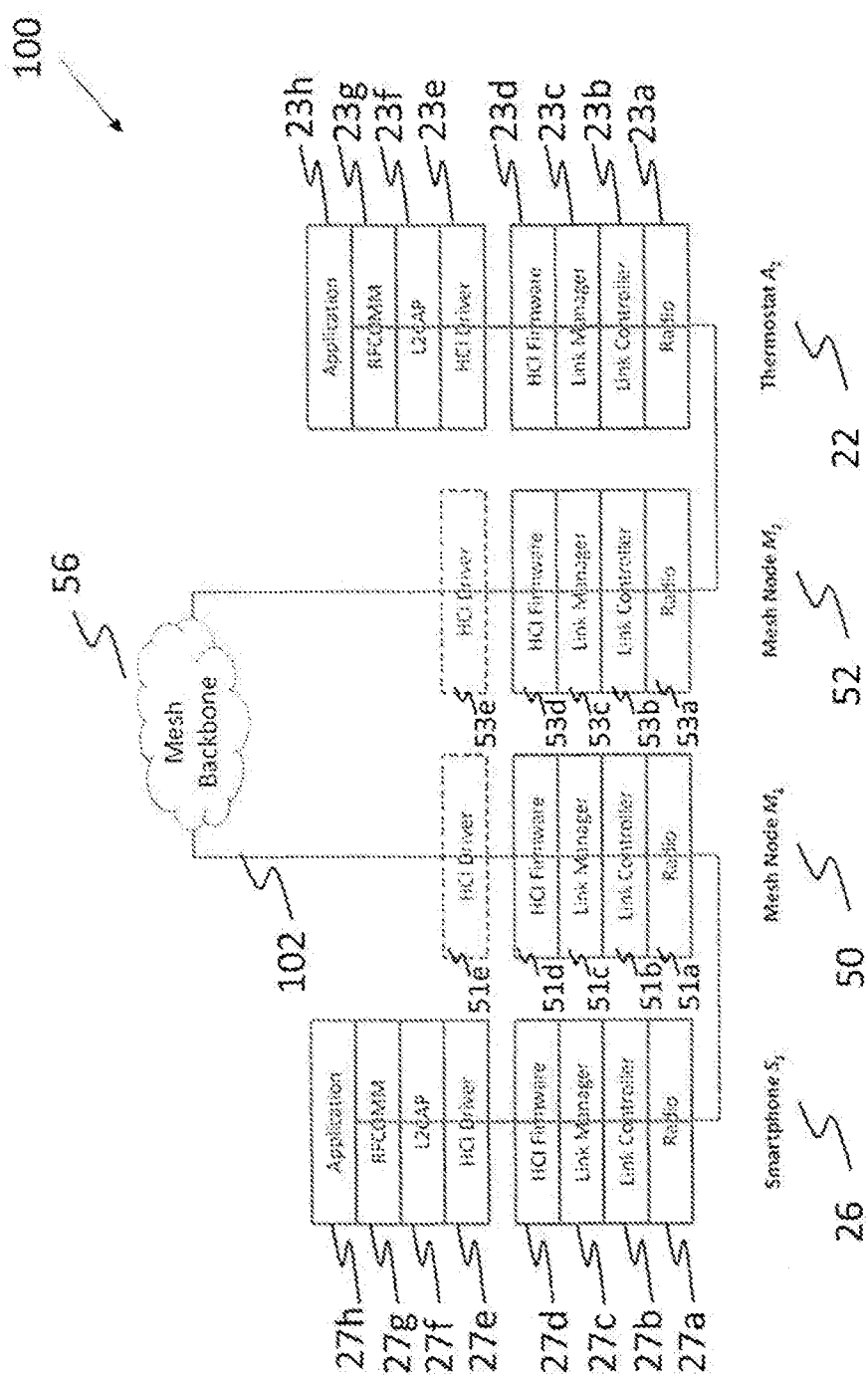
FIG. 6 is a diagram showing a HCI layer proxy function.
Figure 7:
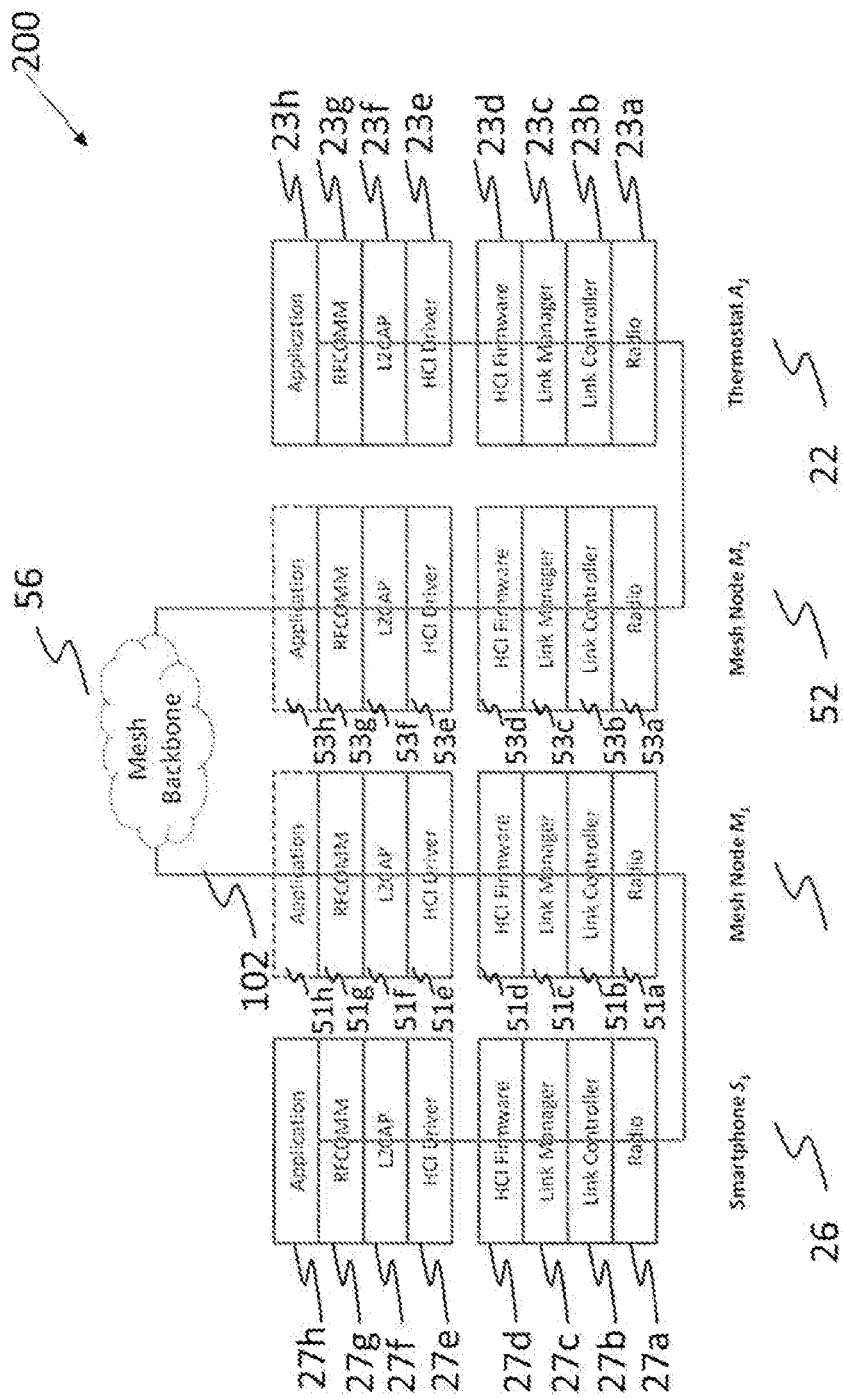
FIG. 7 is a diagram showing an Application layer proxy function.

The Wi-Fi mesh proxy function is realised at either the Bluetooth HCI layer 27e, 51e, 53e, 23e (FIG. 6) or Bluetooth application layer 27h, 51h, 53h, 23h (FIG. 7).

FIG. 6 illustrates the communication flow 100 through a system comprising a smart phone S1 26, mesh nodes M1 50 and M2 52 and thermostat A2 22, as illustrated with reference to FIG. 2. At FIG. 6, simplified protocol stacks are shown for the smart phone S1 26 (layers 27a to 27h), mesh nodes M1 50 (layers 51a to 51e) and M2 52 (layers 53a to 53e) and thermostat A2 22 (layers 23a to 23h). The communication flow through the Bluetooth protocol layers between the two end devices S1 26 and A2 22 is shown with line 102. The communication flow passes through mesh backbone 56, which may or may not include further mesh nodes. For the mesh backbone may be a hybrid mesh backbone having an unlimited number of mesh nodes communicate with one another using convenient communication channels, such as PLC, Wi-Fi and Ethernet. In some examples the mesh backbone 56 is formed from a hybrid mesh backbone having at least two different types of communication channel between the smartphone S1 26 and thermostat A2 22.

Note that the full Bluetooth protocol layer is not shown in these figures. For illustration purposes, only the layers relevant for RFCOMM applications are shown. However, in further examples, other types of Bluetooth communication protocols can be used analogously.

Sometimes both the upper (host—e.g. layers 27e to 27h of smart phone S1 26 or layers 23e to 23h of thermostat A2 22) and lower (controller—e.g. layers 27a to 27d of smart phone S1 26 or layers 23a to 23d of thermostat A2 22) layers of the Bluetooth protocol stack might be embedded in a single chip and the HCI layer might not be exposed to the user. In this case, only application layer proxy might be practical.

FIG. 7 illustrates application layer proxy in a communication flow 200 through a system comprising a smart phone S1 26, mesh nodes M1 50 and M2 52 and thermostat A2 22, as illustrated with reference to FIG. 2. At FIG. 7 simplified protocol stacks are shown for the smart phone S1 26 (layers 27a to 27h), mesh nodes M1 50 (layers 51a to 51h) and M2 52 (layers 53a to 53h) and thermostat A2 22 (layers 23a to 23h). The communication flow through the Bluetooth protocol layers between the two end devices S1 26 and A2 22 is shown with line 102. The communication flow passes through mesh backbone 56, which may or may not include further mesh nodes. For the mesh backbone may be a hybrid mesh backbone having an unlimited number of mesh nodes communicate with one another using convenient communication channels, such as PLC, Wi-Fi and Ethernet. In some examples the mesh backbone 56 is formed from a hybrid mesh backbone having at least two different types of communication channel between the smartphone S1 26 and thermostat A2 22.

Note that the full Bluetooth protocol layer is not shown in these figures. For illustration purposes, only the layers relevant for RFCOMM applications are shown. However, in further examples, other types of Bluetooth communication protocols can be used analogously.

Note that the Bluetooth Low Energy (BLE) protocol stack have different layers; however, the same concept of proxying at either HCI or application layer is also applicable for BLE.

Figure 8:
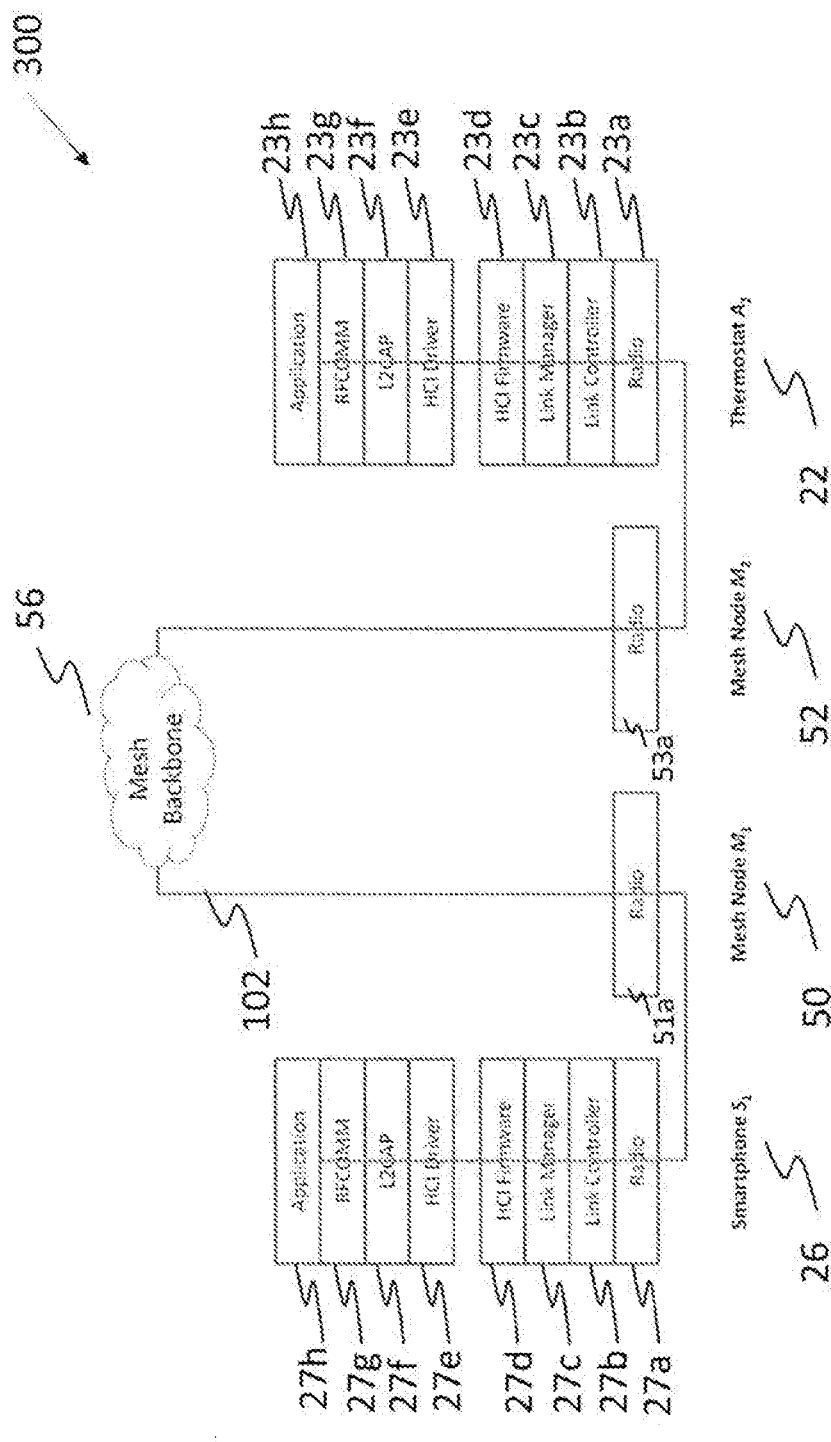
FIG. 8 is a diagram showing a Baseband (radio) layer proxy for audio.

Finally, as the Bluetooth audio packets can also be transmitted directly over the baseband layer, a third proxy method at the baseband/radio layer 51a, 53a can be implemented, as shown in FIG. 8 for audio applications that directly talk to the baseband layer 51a, 53a.

FIG. 8 illustrates baseband layer proxy in a communication flow 300 through a system comprising a smart phone S1 26, mesh nodes M1 50 and M2 52 and thermostat A2 22, as illustrated with reference to FIG. 2. At FIG. 8 simplified protocol stacks are shown for the smart phone S1 26 (layer 27a), mesh nodes M1 50 (layer 51a) and M2 52 (layer 53a) and thermostat A2 22 (layer 23a). The communication flow through the Bluetooth protocol layers between the two end devices Si 26 and A2 22 is shown with line 102. The communication flow passes through mesh backbone 56, which may or may not include further mesh nodes. For the mesh backbone may be a hybrid mesh backbone having an unlimited number of mesh nodes communicate with one another using convenient communication channels, such as PLC, Wi-Fi and Ethernet. In some examples the mesh backbone 56 is formed from a hybrid mesh backbone having at least two different types of communication channel between the smartphone S1 26 and thermostat A2 22.

Note that the full Bluetooth protocol layer is not shown in these figures. For illustration purposes, only the layers relevant are shown.

Before the Wi-Fi mesh proxy can be operated, it is necessary to configure the mesh end nodes as reverse and forward proxies. The necessary steps are described in FIG. 9 and FIG. 10 for the setup in FIG. 2. It is assumed that the Numeric Comparison association model is used for pairing. However, for other models, such as For the Just Works, Out Of Band, or Passkey Entry association models, the processes can be adapted.

Figure 9:
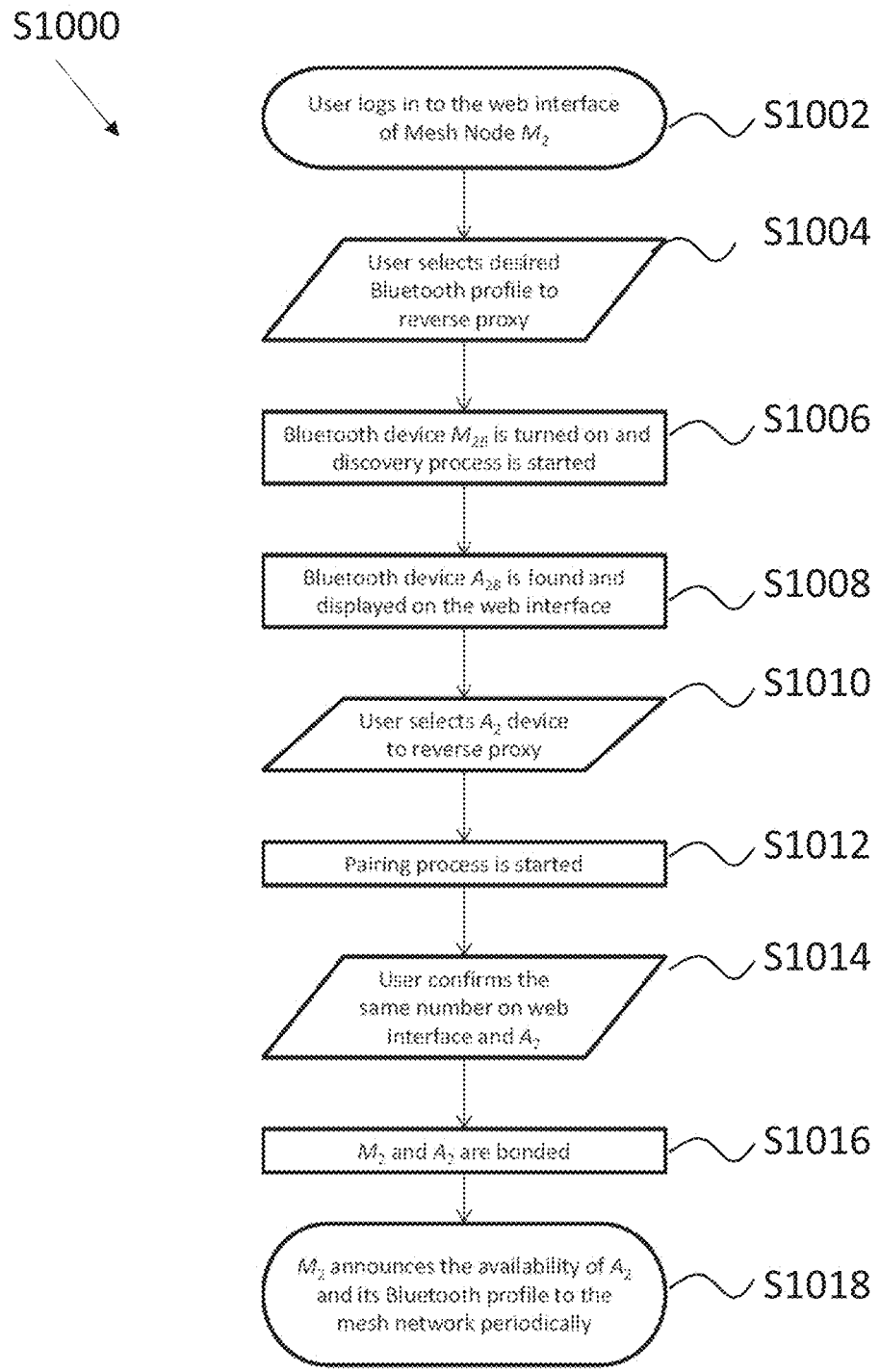
FIG. 9 is a flow chart showing reverse proxy configuration.

FIG. 9 shows a process S1000 for reverse proxy configuration. The process begins at step S1002, when a user logs in to the web interface of mesh node M2 52. The user may be presented with a Bluetooth profile to reverse proxy at step S1004, which the user selects. The process moves to step S1006, whereby Bluetooth device M2B of mesh node M2 52 is turned on and a discovery process is started. The process then moves to step S1008, where the Bluetooth device A2B of thermostat A2 22 is found and displayed on the web interface of mesh node M2 52. If the user has not already selected a device to reverse proxy at step S1004, the user may select the device to proxy after completion of the device discovery steps S1006 and S1008. For example, the user can select the thermostat A2 device to proxy from a list of available devices to proxy that are displayed on the web interface of mesh node M2 52 at step S1010. The process then moves to step S1012 where a pairing process is started. The process then moves to step S1014 where the user confirms that a number displayed on the web interface of mesh node M2 52 is the same as that on the thermostat A2 22. The process then moves to step S1016 where mesh node M2 52 and thermostat A2 22 are bonded. The process then moves to step S1018, where mesh node M2 52 announces the availability of the thermostat A2 22 and its Bluetooth profile to the mesh network 56 periodically.

Figure 10:
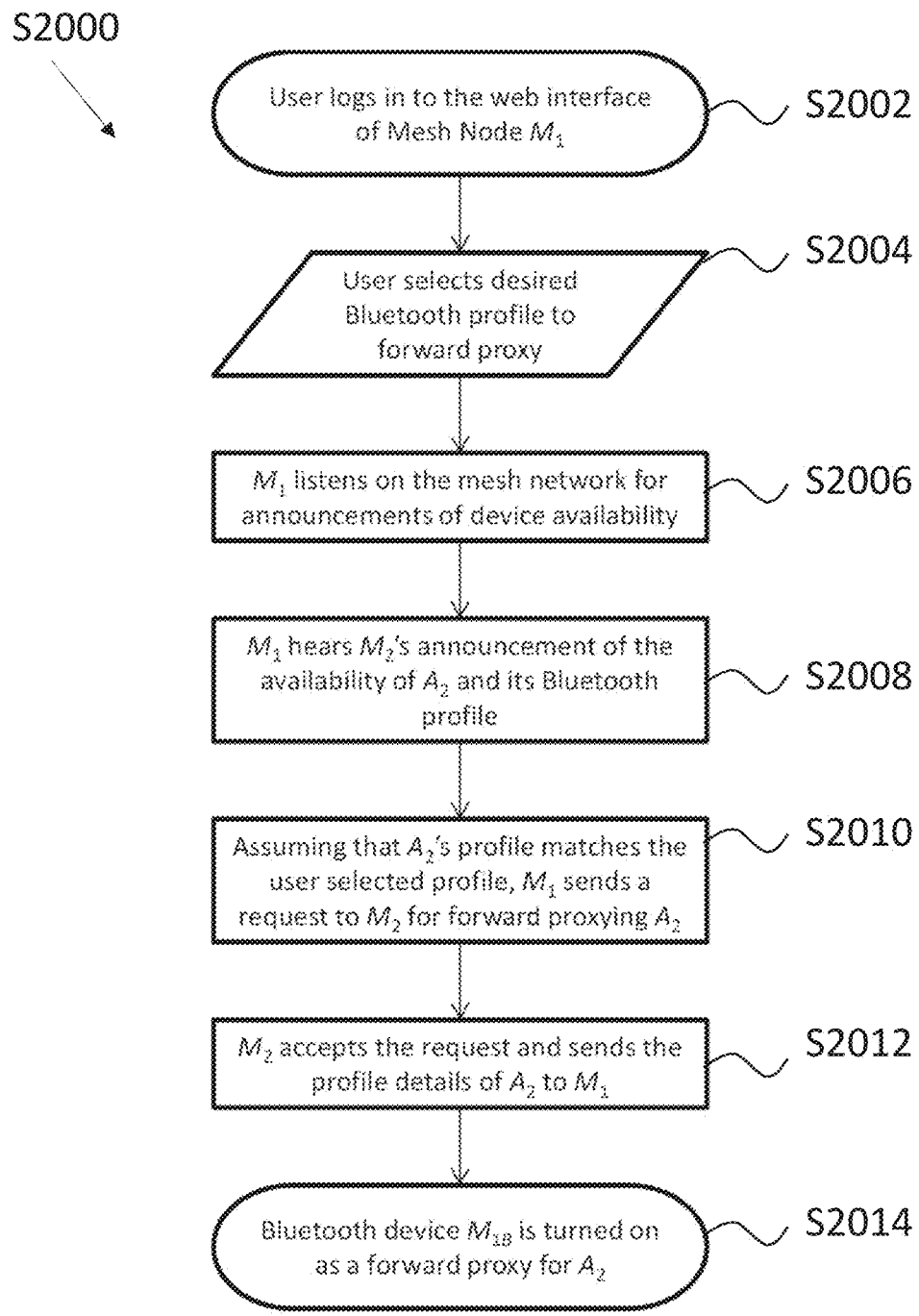
FIG. 10 is a flow chart showing forward proxy configuration.

FIG. 10 shows a process S2000 for forward proxy configuration. The process begins at step S2002, when a user logs in to the web interface of mesh node M1 50. The user may be presented with a Bluetooth profile to forward proxy, at step S2004, which the user selects. The process moves to step S2006, whereby mesh node M1 50 listens on the mesh network 56 for announcements of device availability. The process then moves to step S2008, where mesh node M1 50 hears mesh node M2 52's announcement of the availability of thermostat A2 22 and its Bluetooth profile. The process then moves to step S2010, where, assuming that the thermostat A2 22's profile matches the user selected profile, mesh node M1 50 sends a request to mesh node M2 54 for forward proxying thermostat A2 22. The process then moves to step S2012, where mesh node M2 52 accepts the request from mesh node M1 50 and sends the profile details of the thermostat A2 22 to mesh node M1 50. The process then moves to step S2014, where Bluetooth device M1B of mesh node M1 50 is turned on as a forward proxy for thermostat A2 22. Whilst it is envisaged that the user is presented with a Bluetooth profile to forward proxy at step S2004, alternatively, the device discovery steps S2008 and S2010 are processed prior to providing the user with a profile to select for forward proxying.

Above, it is established that proxying Bluetooth communications through a hybrid mesh network requires that the Bluetooth end devices pair with mesh end notes in order to be practical. The mesh end nodes will have to be configured to proxy the desired Bluetooth profiles. Bluetooth profiles define the required functions and features of each layer in the Bluetooth system. The profile defines the vertical interactions between the layers as well as the peer-to-peer interactions of specific layers between devices. Application behaviours and data formats are also defined by the profile.

In the mesh network of FIG. 2, the mesh node M1 50 would need to proxy the custom profile of the thermostat A2 22 in order for the smart phone S1 26 to be aware of A2 22's existence. A prerequisite for this is that M2 52 be paired with A2 22 so that it can perform service discovery on A2 22. After M2 52 collects all information on the services supported by A2 22 using the SDP, it sends these to M1 50 over the mesh network 56. M1 50 will then proxy these services to S1 26.

If the Bluetooth host of M1 50 configures its service records in the same way as the thermostat A2 22, and also configures its Bluetooth controller through HCI commands to behave the same as A2 22, then the smart phone S1 26 can discover M1 50 and be indirectly aware of the existence of A2 22. The Bluetooth Device Name of M1 50 can be configured differently to indicate that it is acting as a proxy for A2 22.

Once configured, the Bluetooth controller of M1 50 can independently generate inquiry responses to inquiries by S1 26. Neither the Bluetooth host of M1 50 nor A2 22 need be involved. Similarly, the SDP layer of M1 50 can autonomously respond to service discovery requests by S1 26. Again, A2 22 need not be involved. Only the data exchanges between S1 26 and A2 22 will need to be forwarded through the mesh network. For example, when S1 26 attempts to read the current temperature setting from M1 50, M1 50 will forward this read request through the mesh network to M2 52. After M2 52 reads the current temperature setting of A2 22, it will send the result to M1 50, and M1 50 will reply to Si 26 with the current temperature setting of A2 22. Write requests are proxied in the same manner.

The mesh nodes can be configured through their widely used Wi-Fi Access Point (AP) Web User Interfaces (UI). For example, a configuration page can present the available Bluetooth profiles that can be proxied. Once configured, the mesh nodes can perform periodic inquiries to automatically discover and connect to relevant Bluetooth devices in range. The fact that a Bluetooth device is in "mesh range" can then be announced through the mesh network to other nodes, and interested nodes can remotely initiate a service discovery procedure and be ready to proxy the remote Bluetooth device. Note that more than one mesh node can advertise the presence of a given remote Bluetooth device. However, after a proxy connection is established through one of them, the others can either stop advertising or continue to advertise the presence of the remote Bluetooth device. The choice will depend on the particular use case and whether access by multiple remote devices will cause conflicts. In any case, the required coordination between the mesh nodes can easily be achieved.

The Web User Interfaces of the mesh nodes can be used when pairing the Bluetooth end devices with the mesh nodes. For example, in the Numeric Comparison association model of Secure Simple Pairing, the web interface can be used to display the six digit number and present clickable buttons for the user to enter "yes" or "no".

Figure 11:
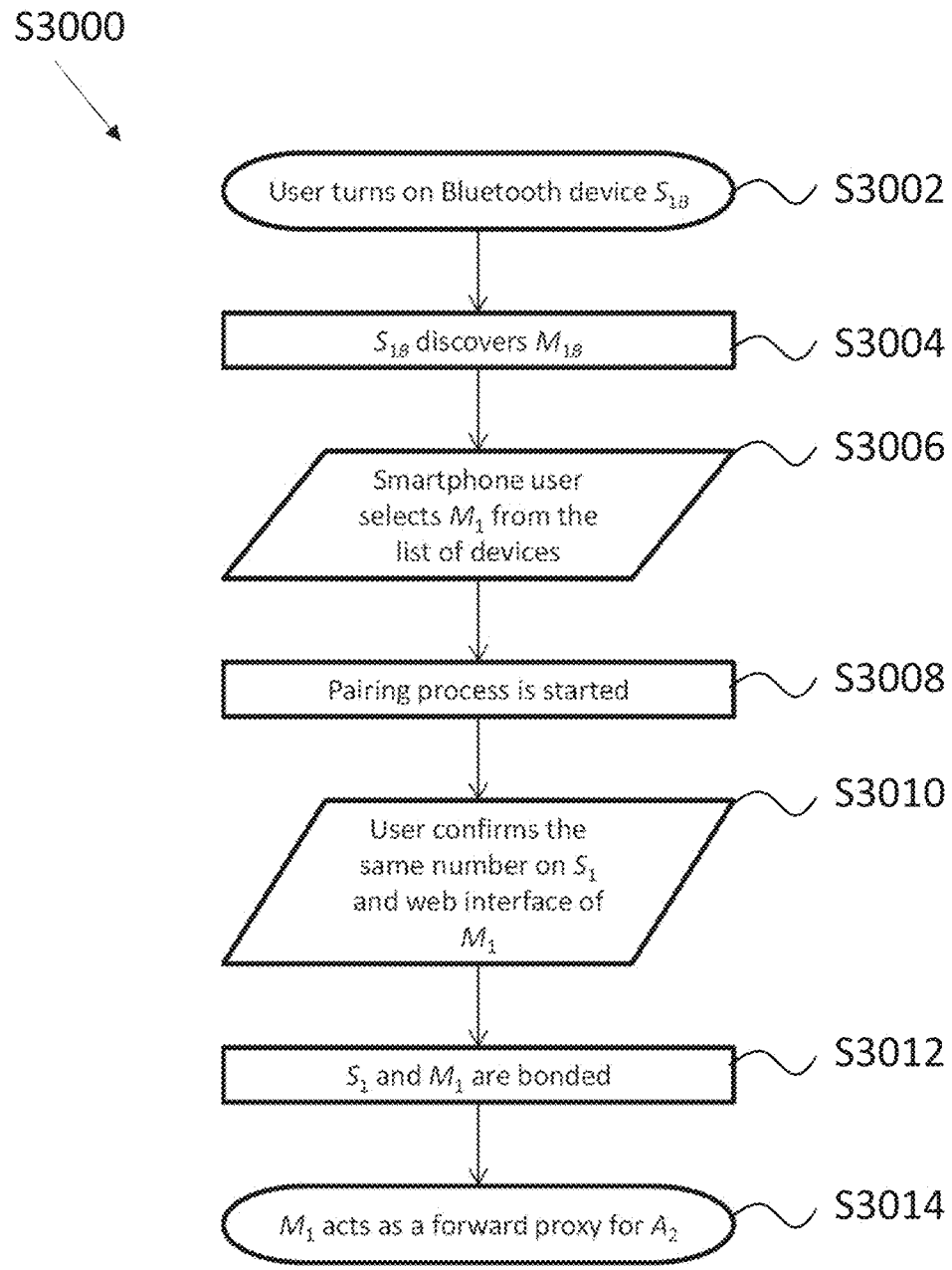
FIG. 11 is a flow chart showing discovery of forward proxy.

After the mesh end nodes are configured, the Bluetooth device of the user can discover the forward proxy node as described in FIG. 11.

FIG. 11 is a flow chart S3000 showing discovery of forward proxy. At step S3002 the process begins when the user turns on Bluetooth device S1B of smart phone S1 26. At step S3004, smart phone S1B discovers the Bluetooth device M1B of mesh node M1 50. The process then moves to step S3006, where the smart phone S1 26 user selects mesh node M1 50 from a list of devices. The process then moves to step S3008 where the pairing process is started. At the next step, S3010, the user of the smart phone S1 26 confirms that the same number is shown on the smart phone S1 as the web interface of the mesh node M1 50. The process then moves to step S3012, where the smart phone S1 26 and the mesh node M1 50 are bonded. Once the smart phone S1 26 and the mesh node M1 50 are bonded, the process moves to step S3014 whereby mesh node M1 50 acts as a forward proxy for thermostat A2 22.

Note that the configuration needs to be performed only once. Thereafter, the Wi-Fi mesh proxy will operate as shown in FIG. 12.

Figure 12:
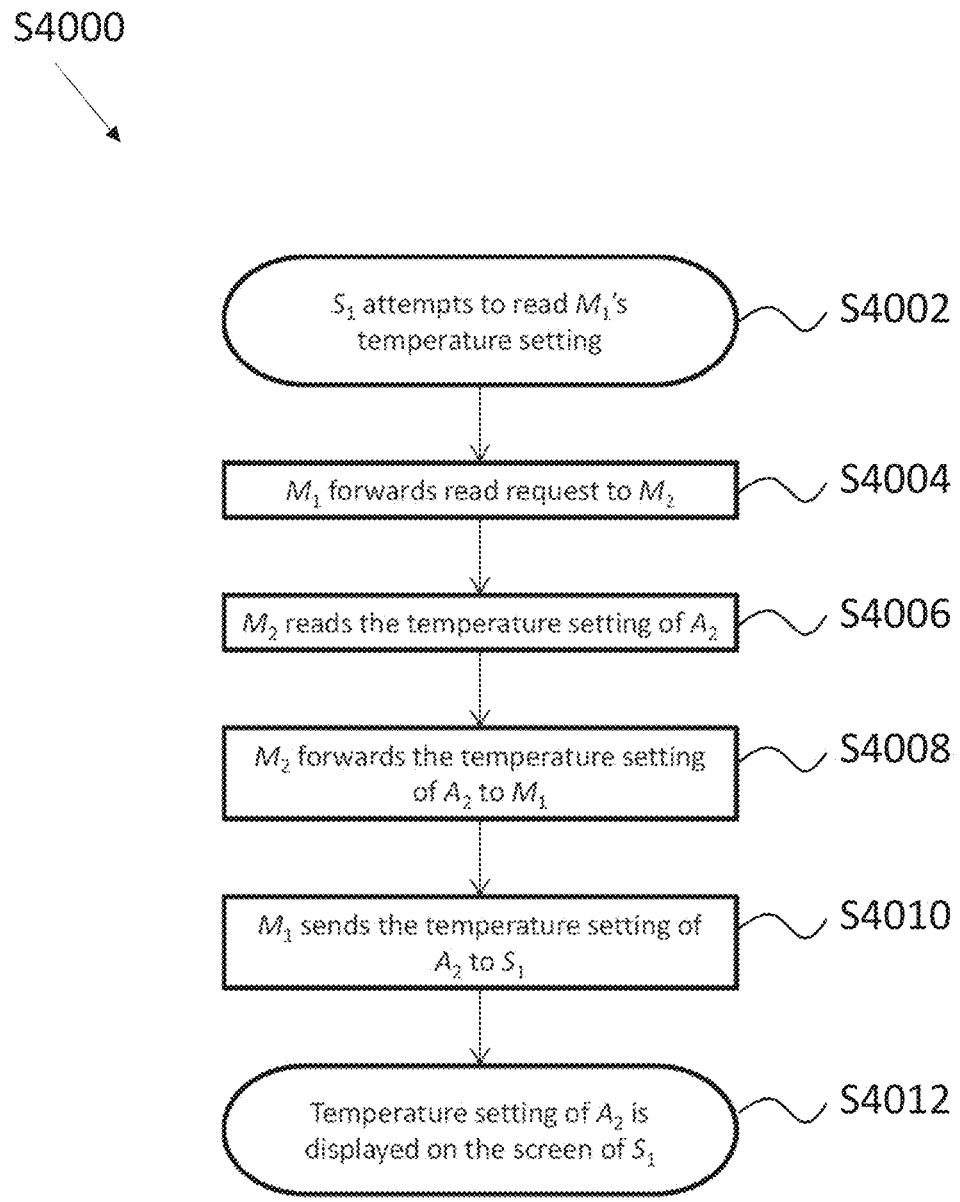
FIG. 12 is a flow chart showing Wi-Fi mesh proxy operation.

FIG. 12 is a flow chart S4000 showing Wi-Fi mesh proxy operation. The process begins at step S4002, where the smart phone S1 26 attempts to read the mesh node M1 50's temperature setting. The process then moves to step S4004, where the mesh node M1 50 forwards a read request to mesh node M2 52. The process then moves to step S4006, where the mesh node M2 52 reads the temperature setting of thermostat A2. The process then moves to step S4008, where the mesh node M2 forwards the temperature setting of the thermostat A2 22 to the mesh node M1 50. The mesh node M1 50 then sends the temperature setting of the thermostat A2 22 to the smart phone S1 26 at step S4010. The process then moves to step S4012, where the temperature setting of the thermostat A2 22 is displayed on a screen of the smart phone S1 26.

The discussion above simplifies what goes on in the lower layers and therefore does not paint the whole picture. For example, between a command HCI_Create_Connection at S1 26 and the event HCI_Connection_Request at M1 50, the lower layers of S1 26 and M1 50 exchange many Link Manager packets without the involvement or notification of the hosts.

Bluetooth pairing enables two devices to authenticate each other and create a shared link key used to encrypt the traffic on the link. When encryption is required and the two devices need to start, for example, the secure simple pairing procedure, the link managers of the two devices will first exchange their public keys without involving the hosts and compute the Diffie-Hellman key. During the authentication phase, they will also exchange random nonces at the link layer to prevent replay attacks and also provide protection against MITM attacks. As the computations during the authentication and link key calculation phases involve the nonces, IO capabilities, and Bluetooth addresses of the two devices, it is practically impossible to interfere in the pairing process between two Bluetooth devices. Therefore, we conclude that in order to be able to extend the ranges of Bluetooth devices with the help of a Wi-Fi or mesh network, each Bluetooth device has to first pair with the integrated Bluetooth device of the mesh node it is directly communicating with.

When using HCI proxying, the HCI data packets sent by the Bluetooth host S1B 26a of S1 26 and received by the Bluetooth host M1B 50a of M1 50 can be just forwarded through the mesh network 56 to M2 52, which then passes them to its own Bluetooth controller. These HCI data packets will eventually be received by the Bluetooth host A2B 22a of A2 22. Thus, by translating between the appropriate HCI commands and events, and directly passing the HCI data packets, Bluetooth communications between out-of-range devices can be achieved.

When using application layer proxying, the L2CAP layer above the Bluetooth controller provides a channel-based abstraction to applications and services. It carries out segmentation and reassembly of application data and multiplexing and de-multiplexing of multiple channels over a shared logical link.

While two Bluetooth devices may have at most one ACL connection between them, there may be multiple active L2CAP and RFCOMM connections. RFCOMM connections are transported within L2CAP connections, and L2CAP connections are encapsulated within ACL connections. RFCOMM ports allow multiple applications on the same device to simultaneously utilize the same transport protocol.

This makes it possible to employ the Bluetooth range extension method only for some of the applications running on the device. For example, instead of forwarding all data traffic, the mesh node M2 52 of FIG. 2 could be configured to only forward the Bluetooth communications on a given RFCOMM port to M1 50. This would allow applications on the smart phone S1 26 and the thermostat A2 22 to establish an RFCOMM link between them, while other Bluetooth communications would be able to independently run on both devices. Thus, while an application on the smart phone S1 26 communicates with the thermostat A2 22 (through the proxy of M1 50 and M2 52), another application could be communicating with the mesh node M1 50 at the same time. Similarly, another Bluetooth application running on the thermostat A2 22 could at the same time communicate with M2 52.

The RFCOMM ports are assigned dynamically and therefore do not have to be the same at both ends. SDP can be used to discover which RFCOMM port a service is running on.

The configuration of the mesh nodes when Bluetooth Low Energy (BLE) is used is essentially the same as in the case of classic Bluetooth. However, the connectionless broadcast mode of BLE is sufficiently different that it deserves its own flowcharts. The configurations of mesh nodes and the proxy operation are shown in FIG. 13, FIG. 14, and FIG. 15.

Figure 13:
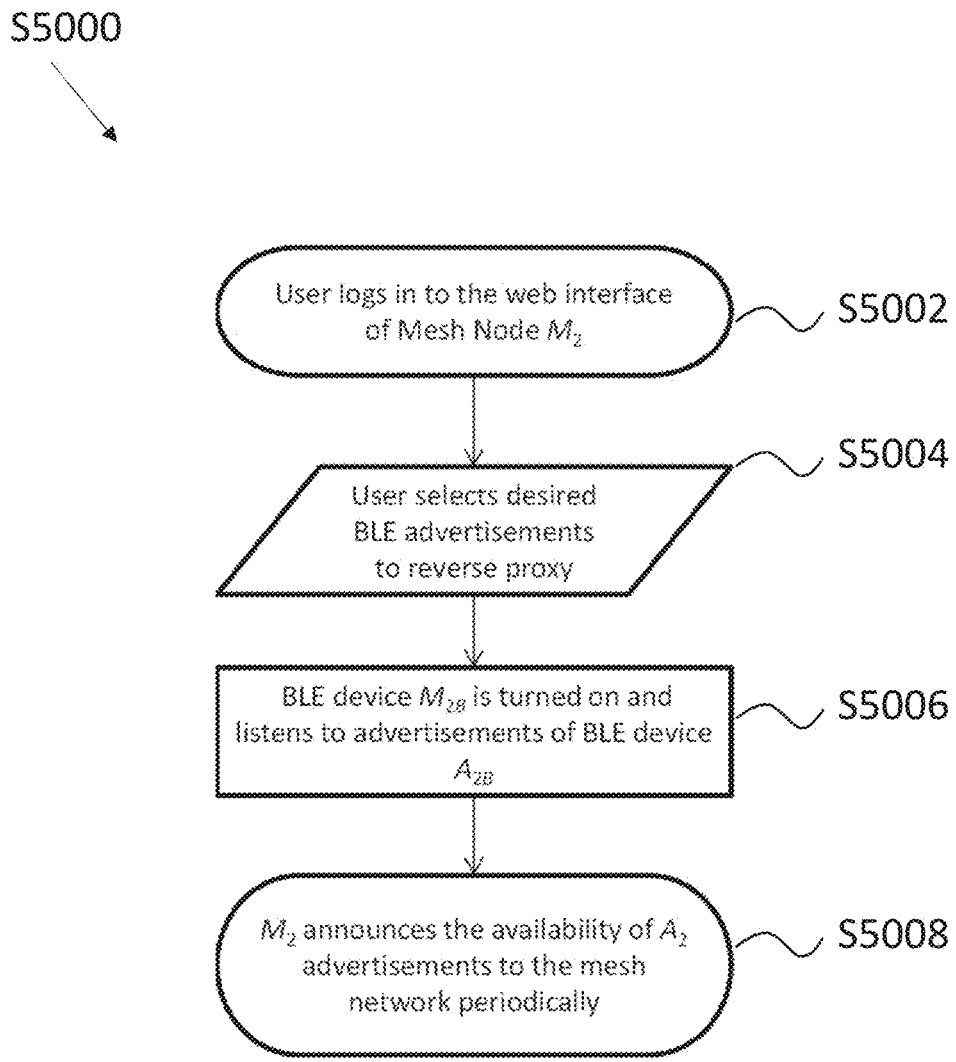
FIG. 13 is a flow chart showing BLE reverse proxy configuration.

FIG. 13 is a flow chart S5000 showing BLE reverse proxy configuration. The process begins at step S5002, when a user logs in to the web interface of the mesh node M2 52. The user is then optionally presented with BLE advertisements to reverse proxy and at step S5004 the user selects the desired BLE advertisements to reverse proxy. The process then moves to step S5006, where the BLE device M2B of the mesh node M2 52 is tuned on and listens to advertisements of the BLE device A2B 22a of the thermostat A2 22. The process then moves to step S5008, where the mesh node M2 52 announces the availability of the thermostat A2 22 advertisements to the mesh network 56 periodically. If the user has not been presented with BLE advertisements to reverse proxy at step S5004, then the user may, alternatively, be presented with a selection of BLE advertisements to reverse proxy at step S5008, including the availability of thermostat A2 22 advertisements, which thermostat A2 22 advertisement can be user selected at step S5008.

Figure 14:
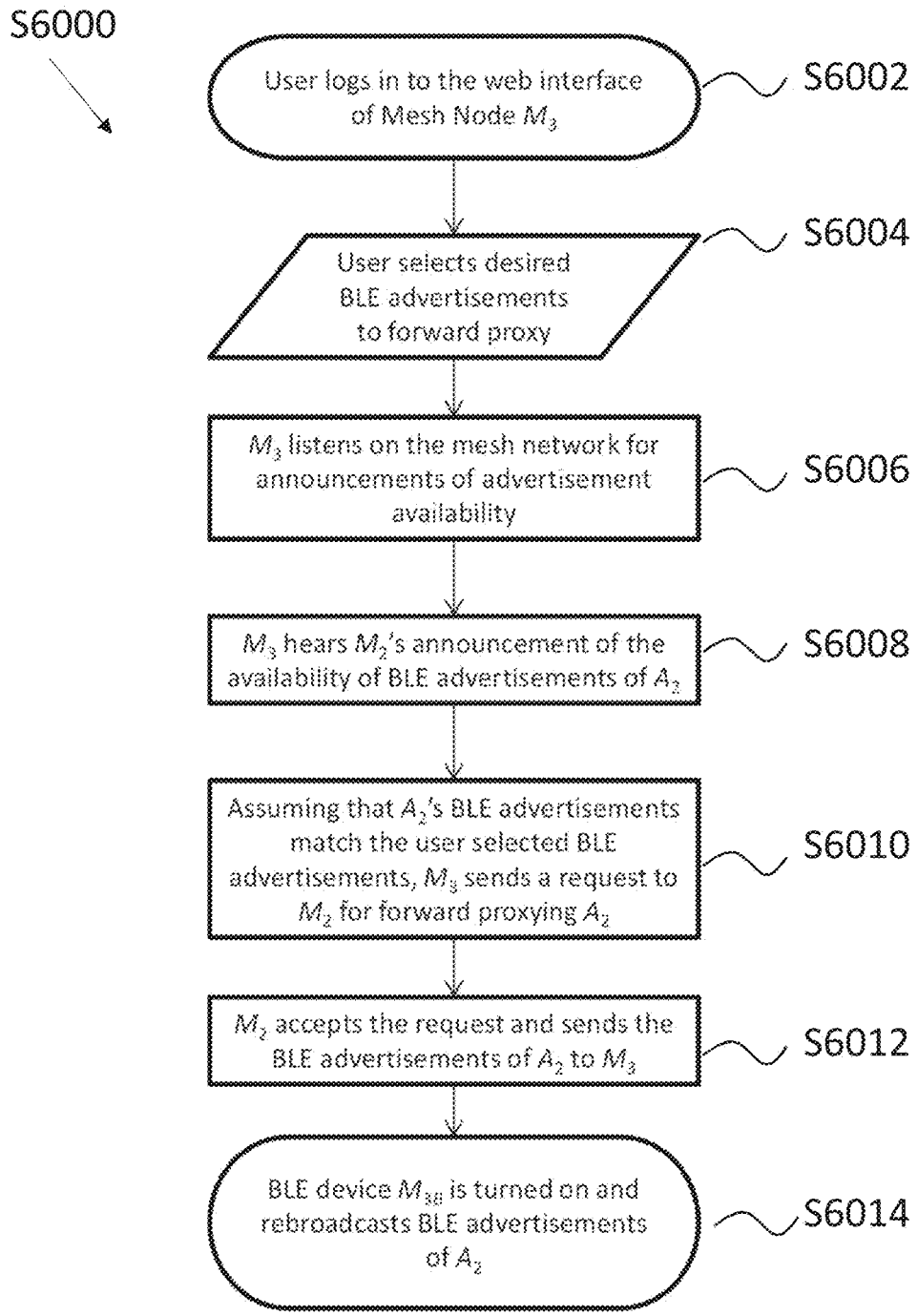
FIG. 14 is a flow chart showing BLE forward proxy configuration.
Figure 15:
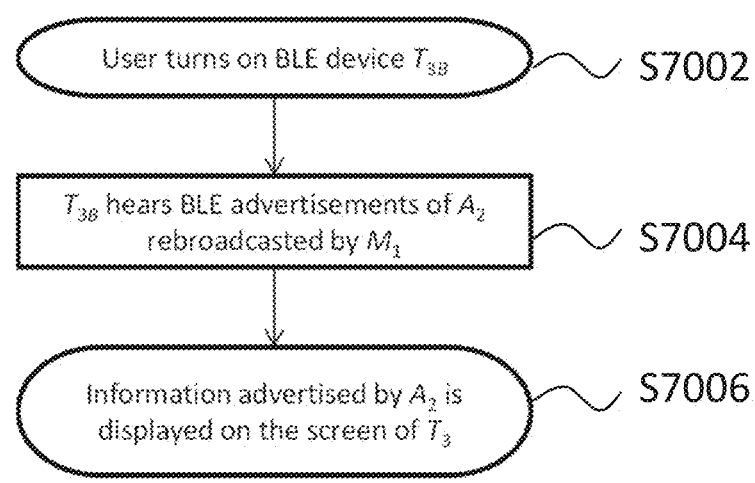
FIG. 15 is a flow chart showing Wi-Fi mesh proxy operation for BLE advertisements.

FIG. 14 is a flow chart S6000 showing BLE forward proxy configuration. The process begins at step S6002, when a user logs in to the web interface of mesh node M3 54. The process then moves to step S6004, where, optionally, the user selects the desired BLE advertisements to forward proxy. The process then moves to step S6006, where the mesh node M3 54 listens on the mesh network 56 for announcements of advertisement availability. The process then moves to step S6008 where mesh node M3 54 hears mesh node M2 52's announcement of the availability of BLE advertisements of the thermostat A2 22. If the user has not been presented with the opportunity to select the desired BLE advertisements to forward proxy at step S6004, alternatively, the user may be presented with a selection of BLE advertisements at step S6008. The user can select a BLE advertisement to forward proxy, such as the BLE advertisement of the thermostat A2 22. The process then moves to step S6010, where, assuming that the thermostat A2 22's BLE advertisements match the user selected BLE advertisements, the mesh node M3 54 sends a request to mesh node M2 52 for forward proxying thermostat A2 22. The mesh node M2 52, at step S6012, then accepts the request and sends the BLE advertisements of the thermostat A2 22 to the mesh node M3 54.

The process then moves to step S6014, where the BLE device M3B 54a of the mesh node M3 54 is turned on and rebroadcasts BLE advertisements of the thermostat A2 22.

FIG. 15 is a flow chart S7000 showing Wi-Fi mesh proxy operation for BLE advertisements. The process begins at step S7002, when a user turns on the BLE device T3B 30a of tablet 30. The process then moves to step S7004 where the BLE device T3B 30a hears BLE advertisements of the thermostat A2 22 rebroadcasted by mesh node M1 50. The process then moves to step S7006, where information advertised by thermostat A2 is displayed on a screen of tablet T3 30.

Using connectionless broadcasting, a BLE device can send data out to any scanning device or receiver in listening range. There are no security or privacy provisions in broadcasting. A hybrid mesh network can also be used to extend the ranges of these BLE advertisements.

The mesh nodes equipped with integrated BLE (or dual mode) devices can be configured to repeatedly scan the pre-set frequencies to receive any such non-connectable advertising packets currently being broadcasted. The advertising packets can then be forwarded to the other mesh nodes through the hybrid mesh network via broadcast or unicast. Other mesh nodes, which are equipped with integrated BLE (or dual mode) devices, can then rebroadcast these advertising packets if they are configured to do so. The mesh nodes can be configured through their AP Web UI.

The rebroadcaster can configure their user-friendly names (Bluetooth Device Name) to indicate that they are rebroadcasting for another Bluetooth device. The broadcasts of a given BLE device can be rebroadcast by more than one mesh node to extend the "mesh range" as desired.

For example, in the mesh network FIG. 2, the mesh node M2 52 could be configured as an observer to scan for the advertisements of A2 22. The mesh node M2 52 could then forward the advertisements broadcast by A2 22 to both of the mesh nodes M1 50 and M3 54. They could then both rebroadcast A2 22's advertisements. Note that S1 26 would then be able to receive the advertisements of A2 22.

BLE also supports an optional secondary advertising payload, which allows devices that detect a broadcasting device to request a second advertising frame (with another payload). Because of real-time constraints in this active scanning mode, observer mesh nodes can be configured to periodically send scan requests to the original broadcasting BLE devices. The received secondary payload can be forwarded along with the primary payload to the rebroadcasting mesh nodes. Thus, rebroadcasters will be able to reply with the secondary payload if and when they receive Scan Request packets. If the information in the secondary payload is time-sensitive, it might need to be pulled when it expires. In an embodiment, for example, a thermostat includes the current temperature in its primary advertising payload but leaves the current humidity level to its secondary advertising payload. Thus, in order for the rebroadcaster to be able to reply with the current (or very recent) humidity level, the observer requests the current humidity level from the thermostat, say once a minute, and sends it to the rebroadcaster to pre-cache. Thus, when the rebroadcaster receives a scan request, it serves at the worst one-minute-old humidity level. The pre-caching period is application-dependent; how fast the information changes determines how often it should be pre-cached.

In the example mesh network, M2 52 could ask for the secondary payload of A2 22 and forward it to the other mesh nodes. Thus, when S1 26 requests secondary payload from M1 50, it will be able to reply A2 22's secondary payload.

A BLE client can inquire about the presence and nature of server's attributes by performing service discovery. The attribute layout and data hierarchy of a server is not considered to be sensitive information and is therefore freely available to all clients.

In addition to reading and writing attributes in the server, a client can also subscribe to the server-initiated updates. The server will then send asynchronous notifications or indications whenever a characteristic's value changes. Note that access to a characteristic value will usually require that the client be paired or bonded with the server.

Notifications are packets that include the handle of a characteristic value attribute along with its current value. The client sends no acknowledgement back to the server to confirm reception. Indications follow the same handle/value format but require an explicit acknowledgment from the client in the form of a confirmation.

Subscription requests for server-initiated updates received by a mesh node will need to be forwarded to the other mesh node so that it can subscribe for matching subscriptions of the remote BLE device. When notifications or indications are then received from the remote BLE device, the other mesh node will forward them through the mesh network. The original mesh node can then send these notifications or indications to the original BLE subscriber device.

In the example mesh network of FIG. 2, when S1 26 subscribes to M1 50 for notifications or indications, M2 52 will be notified so that it can subscribe to corresponding notifications or indications of A2 22. Then, any updates initiated by A2 22 will be forwarded by M2 52 to M1 50, and M1 50 will send these updates to S1 26. Thus, S1 26 will be able to receive the notifications and indications sent by A2 22.

BLE provides the means to exchange data securely over an encrypted link. It has mechanisms in place to encrypt and/or digitally sign packets transmitted over an established connection. In addition to these, BLE supports a privacy feature that reduces the ability to track a BLE device over a period of time by changing the Bluetooth device address on a frequent basis.

The privacy feature is not used in the discovery mode and procedures but it is used during connection mode and connection procedures. In order for a device using the privacy feature to reconnect to known devices, the private address of the device must be resolvable by the other device. The private address is generated using the device's IRK exchanged during the bonding procedure. The IRK can resolve the private addresses that protects an advertising device from being tracked by malicious peers.

If a BLE end device is using the privacy feature, then the mesh node proxying it can also be configured to independently use the privacy feature in its communications with the other BLE end device. This can be a configurable option through the AP Web UI of the mesh node. For example, in FIG. 2, if A2 22 implements the privacy feature in its connection with M2 52, then M1 50 can also use the privacy feature in its connection with S1 26.

Similarly with regard to ZigBee, the following implementation of the invention has been realised. ZigBee is a global standard that defines a set of communication protocols for low-data-rate short-range wireless networking. ZigBee is targeted mainly for battery-powered monitoring and control applications, where low cost and long battery life are the main requirements. In many ZigBee applications, the total time the wireless device is engaged in any type of activity is very limited; the device spends most of its time in a power-saving sleep mode. Such low duty cycles ensure that ZigBee devices can operate several years before their batteries need to be replaced.

The ZigBee standard defines only the networking, application, and security layers of the protocol and adopts IEEE 802.15.4 as its Physical Layer (PHY) and Medium Access Control (MAC) protocols as part of the ZigBee networking protocol. ZigBee-based wireless devices operate in 868 MHz (Europe), 915 MHz (North America), and 2.4 GHz (Global) industrial, scientific, and medical (ISM) frequency bands. The maximum data rate is 250 K bits per second.

802.15.4 describes two types of network nodes—full function devices (FFD) and reduced-function devices (RFD). An RFD is a simple end node—usually a switch or a sensor, or a combination of both. RFDs contain no routing functionality and can only talk to FFDs. In other words, they are child devices that need parents to communicate. Since they are not needed to route messages around the network, they can go to sleep for long periods. FFDs, on the other hand, do the heavy lifting in the network. They are all capable of routing network data between nodes and they can also function as simple nodes, like an RFD.

A special form of FFD is the personal area network (PAN) coordinator. In addition to the functions of a standard FFD of routing message, the PAN coordinator is responsible for setting up and taking charge of the network.

ZigBee uses the following more descriptive terms for the types of network nodes described above: ZigBee Coordinator, ZigBee Router, and ZigBee End Device. The ZigBee coordinator forms a network and also acts as the security trust centre. The coordinator can route packets and allows new nodes to join. A ZigBee router can also route packets and allow new nodes to join. A ZigBee end device can only join a network. It cannot route packets or accept new nodes to join. End devices can go to sleep in order to save power. A router is also allowed to go to sleep.

A ZigBee network must be in one of two networking topologies specified in IEEE 802.15.4: star and peer-to-peer. In the star topology, shown in Error! Reference source not found.6, every device in the network can communicate only with the PAN coordinator. Note that in FIG. 16, C stands for Coordinator, R for Router, and D for End Device). In a peer-to-peer topology, each device can communicate directly with any other device if the devices are placed close enough together to establish a successful communication link. A peer-to-peer network can take different shapes by defining restrictions on the devices that can communicate with each other. If there is no restriction, the peer-to-peer network is known as a mesh topology. See FIG. 17. Another form of peer-to-peer network that ZigBee supports is a tree topology. In this case, after the ZigBee coordinator establishes the initial network. ZigBee routers form the branches and relay the messages. ZigBee end devices act as leaves of the tree and do not participate in message routing. See FIG. 18.

To extend the ranges of the ZigBee devices the Wi-Fi mesh nodes that receive the ZigBee transmissions forward them through the Wi-Fi mesh network to other Wi-Fi mesh nodes, which then retransmit them over the air using their integrated ZigBee devices. For example, consider the sample ZigBee network shown in FIG. 219. This particular network was selected for illustration purposes only; and should not be construed as a limitation to the general applicability of the range extension method. There are five ZigBee end devices shown in this network. Let us assume that there is another ZigBee end device $D_6$, which is not shown, in the vicinity of the network but outside the communication ranges of the ZigBee coordinator and routers. Also assume that a Wi-Fi mesh network, where some nodes are also equipped with integrated ZigBee devices, coexists in the same space. It is then possible to connect the end device $D_6$ to the network of FIG. 19 through this Wi-Fi mesh network as shown in FIG. 20. Note that W stands for Wi-Fi device in FIG. 20.

The ZigBee devices of the proxy nodes in FIG. 20 operate as ZigBee routers. While the router $R_3$ of one proxy node connects the Wi-Fi mesh network to the ZigBee network, the router of the other proxy node $R_4$ connects the out-of-range ZigBee end device $D_6$ to the ZigBee network through the Wi-Fi mesh network. For the rest of the ZigBee network it appears as if there is a direct ZigBee link between the routers $R_3$ and $R_4$.

Note that the proposed range extension method is applicable to both the mesh and tree topologies. The proposed method also allows one to connect to the ZigBee network an out-of-range ZigBee router, say $R_6$ (not shown), instead of the out-of-range ZigBee end device $D_6$. In that case, other routers and devices could also be connected to $R_6$, which means that the proposed range extension method can serve to attach a cluster of ZigBee nodes to the main ZigBee network through a Wi-Fi (or hybrid) mesh network. It is even possible for this cluster to also be connected to the main ZigBee network through another link or links. In this case, the range extension method serves to introduce additional routing links between the nodes of the network. The cost of the link between $R_3$ and $R_4$, which is used to decide on the optimal path for each routing scenario, can be determined based on the probability of successful packet delivery in this link as in the ZigBee standard.

The proposed range extension method also allows roaming. ZigBee end device $D_6$ could move and then connect to the network via another mesh proxy node with router $R_5$, which is not shown, if it is closer. Or, it could also move within range of the original ZigBee network and then connect directly to $R_1$ or $R_2$ or C.

The Wi-Fi or hybrid mesh proxy function at either the ZigBee network layer (FIG. 21) or the ZigBee application layer (FIG. 22). The communication flow through the 802.15.4 and ZigBee protocol layers between the router $R_1$ and the end device $D_6$ is shown with a solid (W shaped) line through the layers and central Mesh Backbone.

Before operating the Wi-Fi mesh proxy, the mesh end nodes are configured as proxies. The necessary steps are described in FIG. 23 and FIG. 24 for the setup in FIG. 20.

After the mesh end nodes are configured, an out-of-range ZigBee device can discover the proxy node as described in FIG. 25 and join the network. Note that the configuration needs to be performed only once. Thereafter, the Wi-Fi mesh proxy will operate on its own.

The invention claimed is:

1. A method of operating intermediate access points to enable extended range communication between low power digital radio devices including a first low power digital radio device and a second low power digital radio device, the intermediate access points including a first intermediate access point and a second intermediate access point, each of the first intermediate access point and the second intermediate access point being dual-band devices such that the first intermediate access point and the second intermediate access point each include a lower range interface and a higher range interface, the first intermediate access point and the second intermediate access point within range for communication via a low power communication protocol over the lower range interface, with the first low power digital radio device and the second low power digital radio device, respectively, the method comprising:
  establishing communication, via a mesh backbone, between the higher range interface of the first intermediate access point and the higher range interface of the second intermediate access point, the mesh backbone operating via a different communication protocol from the low power communication protocol;
  detecting, via the first intermediate access point, the first low power digital radio device;
  bonding or associating the first low power digital radio device with the lower range interface of the first intermediate access point such that the first intermediate access point is in direct communication with the first low power digital radio device over the low power communication protocol;
  bonding or associating with the second low power digital radio device through the second intermediate access point such that the first intermediate access point is in indirect communication with the second low power digital radio device and the first intermediate access point receives, via the second intermediate access point, a service record associated with the second low power digital radio device; and
  performing a proxy function for secure communication between the first low power digital radio device and the second low power digital radio device by mimicking the service record associated with the second low power digital radio device to allow the first low power digital radio device to indirectly discover the second low power digital radio device such that data is transferred between the lower range interface of the first low power digital radio device and the lower range interface of the second low power digital radio device via the higher range interface of the first intermediate access point and the higher range interface of the second intermediate access point.

2. The method according to claim 1, wherein the performing the proxy function performs the proxy function at host controller interface layers.

3. The method according to claim 1, wherein the performing the proxy function performs the proxy function performed at application layers.

4. The method according to claim 1, wherein the performing the proxy function performs the proxy function at baseband layers.

5. The method according to claim 1, wherein the performing the proxy function performs the proxy function at a ZigBee network layer.

6. The method according to claim 1, wherein the higher range interface of the first intermediate access point is a Wi-Fi interface, and wherein the establishing communication comprises:
  establishing communication between the Wi-Fi interface of the first intermediate access point and a Wi-Fi interface of the second intermediate access point.

7. The method according to claim 1, wherein the mesh backbone is a hybrid mesh back bone such that the first intermediate access point and the second intermediate access point are connected over the hybrid mesh back bone via at least two different types of communication channels, wherein
  the at least two different types of communication channels between the intermediate access point and the further intermediate access point include two or more of Wi-Fi, PLC and Ethernet communication channels.

8. The method according to claim 1, wherein the higher range interface is one or more of a Wi-Fi interface, a PLC interface, an Ethernet interface and a Bluetooth interface.

9. The method according to claim 1, wherein the first low power digital radio device and the second low power digital radio device are each one of a Bluetooth device, a Bluetooth Low Energy device, and a ZigBee device.

10. A first access point for use in a communications network, the first access point comprising:
  a lower range interface within range for communication via a low power communication protocol with a first low power digital radio device, the first low power digital radio device ;
  a higher range interface configured to communicate via a mesh backbone with a higher range interface of a second access point, the mesh backbone operating via a different communication protocol from the low power communication protocol such that the first access point is a dual-band device; and
  a processor configured to,
    establish communication, via the higher range interface of the first access point, with the higher range interface of the second access point over the mesh backbone,
    detect the first low power digital radio device,
    bond or associate the first low power digital radio device with the lower range interface of the first access point such that the first access point is in direct communication with the first low power digital radio device over the low power communication protocol,
    bond or associate with a second low power digital radio device through the second access point such that the first access point is in indirect communication with the second low power digital radio device and the first access point receives, via the second access point, a service record associated with the second low power digital radio device, and
    perform a proxy function for secure communication between the first low power digital radio device and the second low power digital radio device by mimicking the service record associated with the second low power digital radio device to allow the first low power digital radio device to indirectly discover the second low power digital radio device such that data is transferred between the lower range interface of the first low power digital radio device and the lower range interface of the second low power digital radio device via the higher range interface of the first access point and the higher range interface of the second access point.

11. The access point according to claim 10, wherein the processor is configured to perform the proxy function at host controller interface layers.

12. The access point according to claim 10, wherein the processor is configured to perform the proxy function at application layers.

13. The access point according to claim 10, wherein the processor is configured to perform the proxy function at baseband interface layers.

14. The access point according to claim 10, wherein the higher range interface is a Wi-Fi interface, and wherein
the processor is configured to establish communication with a Wi-Fi interface of the second access point.

15. The access point according to claim 10, wherein the mesh backbone is a hybrid mesh back bone such that the first access point and the second access point are connected over the hybrid mesh back bone via at least two different types of communication channels, wherein
the at least two different types of communication channels between the first access point and the second access point include two or more of Wi-Fi, PLC and Ethernet communication channels.

16. The access point according to claim 10, wherein the higher range interface is one or more of a Wi-Fi interface, a PLC interface, an Ethernet interface and a Bluetooth interface.

17. The access point according to claim 10, wherein the first low power digital radio device and the second low power digital radio device are each one of a Bluetooth device, a Bluetooth Low Energy device, and a ZigBee device.

18. A communication network comprising: the first access point and the second access point of claim 10.

* * * * *